United States Patent
Van der Stouw et al.

(10) Patent No.: US 8,535,123 B2
(45) Date of Patent: Sep. 17, 2013

(54) DEBONER

(75) Inventors: Reinhard Nicolaas Van der Stouw, Nieuw-Beijerland (NL); Dirk Cornelis Stooker, Al's-Gravendeel (NL)

(73) Assignee: Systemate Group, B.V., Numansdorp (NL)

( * ) Notice: Subject to any disclaimer, the term of this patent is extended or adjusted under 35 U.S.C. 154(b) by 930 days.

(21) Appl. No.: 12/093,380

(22) PCT Filed: Nov. 10, 2006

(86) PCT No.: PCT/NL2006/000564
§ 371 (c)(1),
(2), (4) Date: Aug. 29, 2008

(87) PCT Pub. No.: WO2007/055571
PCT Pub. Date: May 18, 2007

(65) Prior Publication Data
US 2009/0298404 A1    Dec. 3, 2009

(30) Foreign Application Priority Data
Nov. 10, 2005   (NL) .................................... 1030388

(51) Int. Cl.
*A22C 17/00*    (2006.01)
*A22C 21/00*    (2006.01)

(52) U.S. Cl.
USPC .......................................... 452/135; 452/136

(58) Field of Classification Search
USPC ................... 452/135–136, 138–139
See application file for complete search history.

(56) References Cited

U.S. PATENT DOCUMENTS

| | | | | |
|---|---|---|---|---|
| 4,674,151 A * | 6/1987 | Ketels | ............ | 452/138 |
| 4,882,810 A * | 11/1989 | Ostholt et al. | ............ | 452/136 |
| 4,893,378 A * | 1/1990 | Hazenbroek et al. | ......... | 452/136 |
| 4,993,113 A * | 2/1991 | Hazenbroek | ........... | 452/136 |
| 5,064,403 A * | 11/1991 | Elsten | ........... | 452/135 |
| 5,090,940 A * | 2/1992 | Adkison | ........... | 452/136 |
| 5,173,077 A * | 12/1992 | van den Nieuwelaar et al. | ........... | 452/163 |
| 5,176,562 A * | 1/1993 | Martin et al. | ........... | 452/136 |
| 5,277,649 A | 1/1994 | Adkison | | |
| 5,462,477 A * | 10/1995 | Ketels | ........... | 452/135 |
| 5,660,583 A * | 8/1997 | Roberts | ........... | 452/136 |
| 5,713,787 A * | 2/1998 | Schoenmakers et al. | ..... | 452/136 |
| 5,810,653 A * | 9/1998 | Van Craaikamp et al. | ... | 452/136 |
| 5,976,004 A * | 11/1999 | Hazenbroek | ........... | 452/136 |
| 6,027,404 A * | 2/2000 | Wols | ........... | 452/138 |
| 6,036,590 A * | 3/2000 | Kessel | ........... | 452/138 |
| 6,106,384 A * | 8/2000 | Mutoh et al. | ........... | 452/135 |
| 6,383,067 B1 * | 5/2002 | Kessel | ........... | 452/138 |
| 7,004,830 B2 * | 2/2006 | van der Steen et al. | ...... | 452/185 |
| 7,479,059 B2 * | 1/2009 | Seesing | ........... | 452/138 |

* cited by examiner

*Primary Examiner* — David Parsley
(74) *Attorney, Agent, or Firm* — Thomas/Horstemeyer, LLP

(57) ABSTRACT

Deboning modules 50 move along a processing path for deboning poultry legs or wings having bones connected by an intermediate joint. The modules each include an ankle knuckle holder 60 and a hip knuckle holder 90 for supporting the leg and the hip bone in alignment with each other. Stripping claw 154 and hip knuckle holder 90 move toward each other for stripping meat from the leg bone and hip bone toward the intermediate leg joint. A cylinder blade 71 moves about the ankle knuckle holder toward the hip knuckle holder for cutting the accumulated meat at the hip knuckle holder.

14 Claims, 28 Drawing Sheets

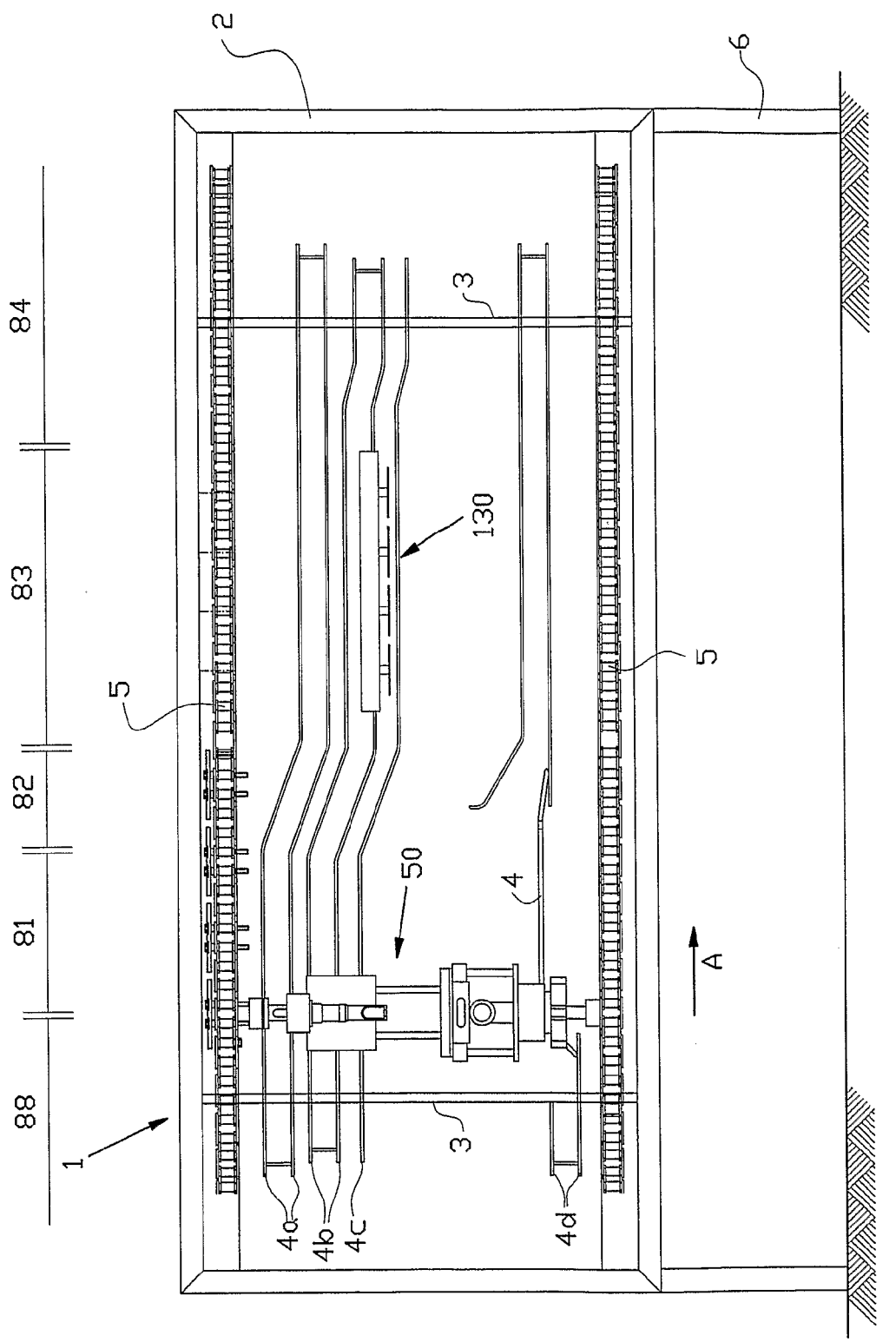

DEBONER

CROSS-REFERENCE TO RELATED APPLICATION

This application claims priority to "Deboner," having serial number PCT/NL2006/000564, filed on Nov. 10, 2006. This application claims priority to NL. application no. 1030388, filed on Nov. 10, 2005, which is entirely incorporated herein by reference.

BACKGROUND OF THE INVENTION

The invention relates to a device for filleting or deboning leg or wing parts of poultry, such as chicken or turkeys.

U.S. Pat. No. 5,277,649 in the name of the applicant shows a deboner that is adapted for in a set-up deboning the chicken leg of both the thighbone and the drumstick. Said deboner comprises several deboning modules that move along a processing path. Each deboning module comprises a support block in which the end of the thighbone is secured, and stripping claws in which the end of the drumstick bone is secured. The bones are held in line with each other by a straight bar positioned along the processing path, which bar keeps the chicken legs in a stretched position at the level of the knee joint. During the deboning process the stripping claws move towards the support block, wherein the end of the drumstick bone is accommodated in a hollow cylinder blade that moves along, with which blade the meat mass will finally be cut loose against the support block.

During the movement of the stripping claws towards the support block large stripping forces are exerted on the chicken leg, as a result of which the knee joint is able to buckle through against the stationary straight bar. The drum stick bone may as a result end up beyond the hollow cylinder blade, and the thigh bone may break, as a result of which the deboning process can be disrupted.

A further known deboner for a chicken leg comprises a clamp for attaching the knee joint, and movable supports on both sides and spaced apart from the clamp for pushing the thigh bone and drum stick upward, as a result of which the knee joint is held in a stretched position. A movable cylinder blade pierces the positioned chicken bone around the bones, as a result of which the chicken leg is pushed out of the clamp and the supports that move away. An incorrect placement of the chicken leg in the clamp may result in the knee joint not remaining in the wanted stretched position, resulting in the cylinder blade cutting the chicken leg to pieces. The diameter of the cylinder blade is adapted to accommodation of the knee joint, as a result of which usable meat is left behind around the bones.

It is an object of the invention to provide a device for filleting or deboning leg or wing parts of poultry, wherein the position of the leg or wing part, and particularly the parts that are engaged during deboning, can be maintained.

It is an object of the invention to provide a device for filleting or deboning leg or wing parts of poultry having an increased meat yield.

SUMMARY OF THE INVENTION

The invention, according to a first aspect, provides a device for filleting or deboning leg or wing parts of poultry, comprising a first holder having first holder means for positioning an end of a leg or wing part, and second holder means for cooperation with the first holder means, wherein the second holder means are movable with respect to the first holder means in axial direction or bone direction of the leg or wing part. Because of the first holder means the end can be positioned for the filleting or deboning process, wherein due to the cooperation the positioning can be maintained during the process. Due to axial movement it is moreover possible to achieve a compact structure of the first holder.

The invention, according to a further aspect, furthermore provides a device for filleting or deboning leg parts of poultry, comprising a holder assembly for a leg part to move the leg part along a processing path, and a blade positioned along the processing path, wherein the holder assembly comprises a first holder and a second holder for holding both ends of the leg part, wherein the first and second holder are adapted for rotation of the leg part about its bone axis when the leg part passes along the blade. Due to the rotation the muscles and tendons in the leg part can be cut loose all round for the filleting or deboning process. In an as regards structure simple embodiment, the holder assembly is adapted for step-wise rotation of the leg part about its bone axis when the leg part passes along the blade. Due to step-wise rotation the rotation steps can simply be effected using stops or flights along a processing path.

In one embodiment the second holder means are movable with respect to the first holder means from an inactive position, in which the end of the leg or wing part can be placed in the first holder, and an active position, in which the end is confined in the holder. In that case the leg or wing part can be placed at the beginning or at the end of the process, after which during the process the position of the leg or wing part remains the same.

In one embodiment the first holder means are adapted for permanently holding the end of the leg or wing part during the filleting or deboning process. Due to permanently holding the position of the end, and thus the entire leg or wing part can be maintained during the process.

The second holder means may themselves serve as aid or processing part during the process when the second holder means are adapted for with a leading end passing the first holder means in the direction of the leg or wing part. As a result the second holder means get an extra function in addition to cooperating with the first holder means in a retaining manner. In one embodiment thereof the second holder means are adapted for remaining active after the leading end has passed past the first holder means.

The leading end may particularly act as cutting tool when the leading end comprises a cuffing edge. In one embodiment thereof the second holder means have in that case been formed including a cylinder blade, wherein at least a portion of the first holder means is located in the cylinder blade. Because the first holder means are located in the cylinder blade they are able to continue guiding the end of the leg or wing part in the cylinder blade or even pull at it, as a result of which the cylinder blade is able to cut all round through the meat on the held bone. The leg or wing part can remain in the stretched position.

In one embodiment the first and second holder means are adapted for in radial direction of the leg or wing part fittingly confining the end of the leg or wing part. The fitting confinement can further counteract the bending away of the held end in radial direction, and thus in the natural direction of the elbow or knee joint.

Over a large area of the leg or wing part usable parts of meat can be laid bare for the filleting or deboning process when the first holder means comprise first gripper means for at least partially engaging about a narrowed portion behind a knuckle of the leg or wing part, and a placement opening for placing the leg or wing part in the first holder means and then bringing the narrowed portion in contact with the gripper means.

In one embodiment the first gripper means comprise at least one curved first gripper member for fitting abutment against the narrowed portion behind the knuckle of the leg or wing part, as a result of which the end can already to a certain extent be placed stably in the first holder even before the second holder means have been activated.

In a further development the first gripper means comprise two opposite first gripper members, preferably in U-arrangement, for abutment against the narrowed portion behind the knuckle of the leg or wing part, wherein the first gripper members with opposite ends define a part of the placement opening of which the size is adapted to the size of the narrowed portion behind the knuckle.

In a simple embodiment the first holder means comprise a first hollow cylinder, wherein the placement opening and the gripper means have been formed by a recess in the cylinder wall at an end of the hollow cylinder.

In a compact embodiment the device comprises a cylinder blade that is positioned around the first hollow cylinder, preferably snugly fitting.

Meat can be removed to the bone of the leg or wing part when the device comprises first stripping means that are adapted for engagement onto the meat behind the first holder means and then stripping the meat in a direction away from the first holder.

In one embodiment the first holder means during the deboning process are kept at the same height in axial direction of the leg or wing part.

The leg or wing parts can be placed, for instance manually, in the first holder with overview when the first holder and/or first holder means are adapted for keeping the leg or wing part in vertical position, preferably with the ankle knuckle upward.

In a further development the device comprises second stripping means that are adapted for stripping meat in the direction of the first holder, wherein preferably the first and second stripping means are adapted for in between them compressing meat or bringing the meat under compression and then driving the meat from the bone parts at the level of the knee joint. By driving from the bone parts, yielding membranes and fat tissue portions can be ripped from the bone parts during stripping. The cylinder blade cutting through the meat moreover runs more smoothly when the meat is under compression. The meat rotating along with the blade can be counteracted by the compression between the stripping means.

In one embodiment the device comprises a knee capsule cutter positioned along the processing path for cutting into the knee capsule after a stripping motion of the first and/or second stripping means. The knee capsule extends over the knee and partially consists of tendons. The knee capsule cutter may act supplementary to for instance the said cutting edge of the second holding means in order to ensure that the tendons are sufficiently cut through.

In one embodiment the knee capsule cutter comprises a meat retainer and a blade, wherein the meat retainer is adapted for locally detaining stripped meat from the first and/or second stripping means for providing an access space for the blade between the first and/or second stripping means and the meat retainer. The meat retainer is able to shield the meat from the blade, so that the blade only cuts into the knee capsule without damaging the surrounding meat. Misplaced cuts in the surrounding meat are not wanted.

In one embodiment the meat retainer comprises a first meat guiding surface with pilot edge, which surface extends in transport direction and is inclined towards the bone axis, for movement of stripped meat with respect to the bone in a direction towards the knee joint. The meat guiding plate is able to retain meat that after stripping has moved back in the stripping direction, which can take place with little force as the meat has already been stripped off.

Transfer of stripped meat from the stripping means to the first meat guiding surface can take place in a smooth motion when the first meat guiding surface is positioned for by means of the pilot edge finding support on a stripping surface of the first and/or second stripping means. The meat guiding surface may in that case yield with the stripping means when the meat guiding plate is hinged across the pilot edge to a stationary carrier of the meat retainer.

In one embodiment the meat retainer comprises a second meat guiding surface extending substantially parallel to the transport direction, and positioned at a short distance from the blade for guiding the stripped meat around the blade. The second meat guiding surface extending parallel to the transport direction may shield the flat side of a blade, in the form of a circular blade, from colliding with the meat.

In a compact embodiment the blade is positioned for movement over a stripping surface of the first and/or second stripping means at a short distance from or in contact with the stripping surface.

In one embodiment the knee capsule cutter is positioned for cutting into the knee capsule from one bone side.

According to a further aspect, the invention furthermore provides a device for filleting or deboning leg or wing parts of poultry, comprising a holder for an end of a leg or wing part, wherein the holder comprises a plate in which a passage opening is situated for the end of the leg or wing part, wherein the passage opening is at least partially bowl-shaped. The bowl shape renders the holder suitable for at least partially accommodating a knee or elbow joint therein, as a result of which the leg part getting stuck or jammed in the passage at or after an axial movement in the direction of the holder can be counteracted.

The size of the passage opening can be adapted, for instance by placing a knuckle through the passage opening, when the plate comprises a slot oriented radially towards the passage opening, wherein a closing piece is accommodated in the slot which closing piece is formed complementary to the plate and the passage opening, wherein the closing piece is movable in the slot with respect to the passage opening.

In one embodiment the passage opening at the inside is at least partially bounded by a cutting or scraping edge, wherein the cutting or scraping edge preferably forms a portion of a separately placeable blade. The cutting or scraping edge may ensure a proper detachment of the meat from the bone, resulting in the meat looking undamaged. Cutting or scraping edges that have become blunt can simply be replaced by replacing the separately placeable blade. The other parts of the deboner can therefore be durably used.

Inner edges of the passage opening can be used as stripper for meat when the smallest size of the passage opening is larger than the size of the bone parts between a knuckle and a knee joint, and is smaller than the size of the knee joint.

Parts of for instance stripped meat can be separated from the bone parts when the device comprises a cylinder blade for cutting the meat loose all round from a bone of the leg or wing part, wherein the cylinder blade is positioned for coming into cutting contact with the plate. In one embodiment thereof the diameter of the cylinder blade is larger than the largest diameter of the passage opening.

The invention furthermore provides, according to a further aspect, a device for processing parts of poultry, particularly for filleting or deboning leg or wing parts of poultry, comprising a circular blade suspended along the processing path, wherein the circular blade is attached to a driven shaft that is positioned at fixed distance from and parallel to a drive shaft for the circular blade, wherein the drive shaft and the driven shaft are rotatably connected with a joint swivelling arm and are connected one to the other to a drive transmission, wherein friction in the drive transmission provides a positioning force for pressing the swivelling arm and thus the circular blade in the direction of the processing path. Additional compression or positioning mean for the circular blade, such as a compression spring, may be superfluous in this suspension.

SHORT DESCRIPTION OF THE DRAWINGS

The invention will be elucidated on the basis of a number of exemplary embodiments shown in the attached drawings, in which:

FIGS. 1A and 1B show both long sides of a deboner according to the invention, having a deboning unit for in this example deboning a chicken leg;

DETAILED DESCRIPTION OF THE DRAWINGS

Figure 1B:
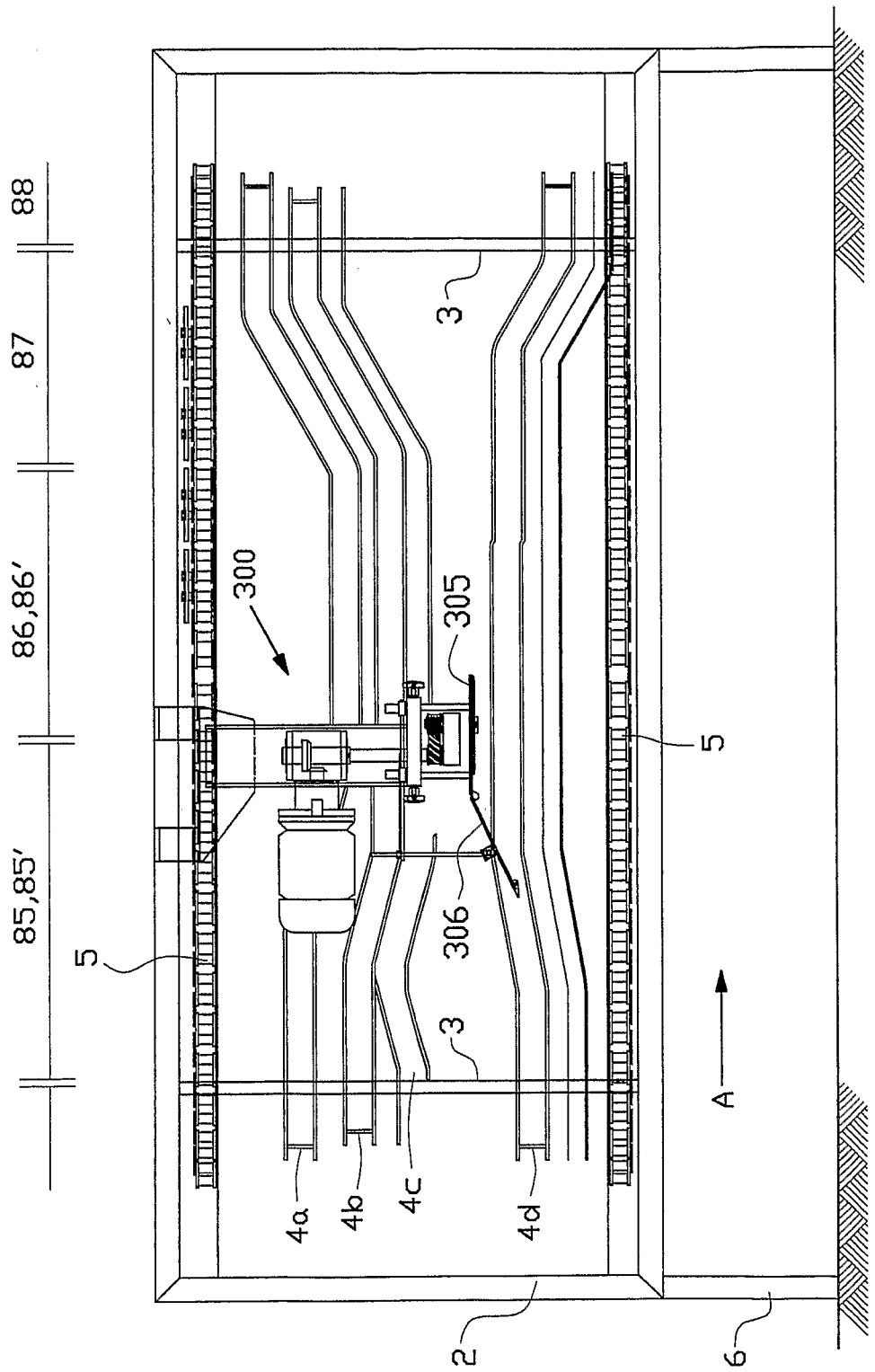

The deboner 1 according to an embodiment of the invention as shown in FIGS. 1A and 1B comprises a frame 2 placed on the legs 6, having at the upper side and lower side endless circulating chain conveyors 5 of which the chain wheels (not shown) are driven synchronously by means of vertical shafts 3. The deboner 1 comprises several deboning units 50 that have been attached to the chain conveyors 5 for transport according to a horizontal conveyor track in transport direction A. FIG. 1A only shows one of the deboners 50.

Along the conveyor track, curve paths 4a-4d have been positioned at the inside for operating the deboning units 50, and at the outside a longitudinal cutter 130. At the opposite outer side the deboner preferably comprises a knee capsule cutter 300. The conveyor track, considered in transport direction A, consecutively comprises a placement section 81, a confinement or clamping section 82, a transverse cutting section 83, an engagement section 84, and at the opposite side a stripping section 85, an all round cutting section 86, a release section 87 and a return section 88. In an alternative embodiment the placement section 81, the confinement or clamping section 82, the transverse cutting section 83, the engagement section 84, the stripping section 85 and the all round cutting section 86 extend at the same side of the machine, so that an operator is able to keep an overview of the various consecutive process steps.

Figure 2A:
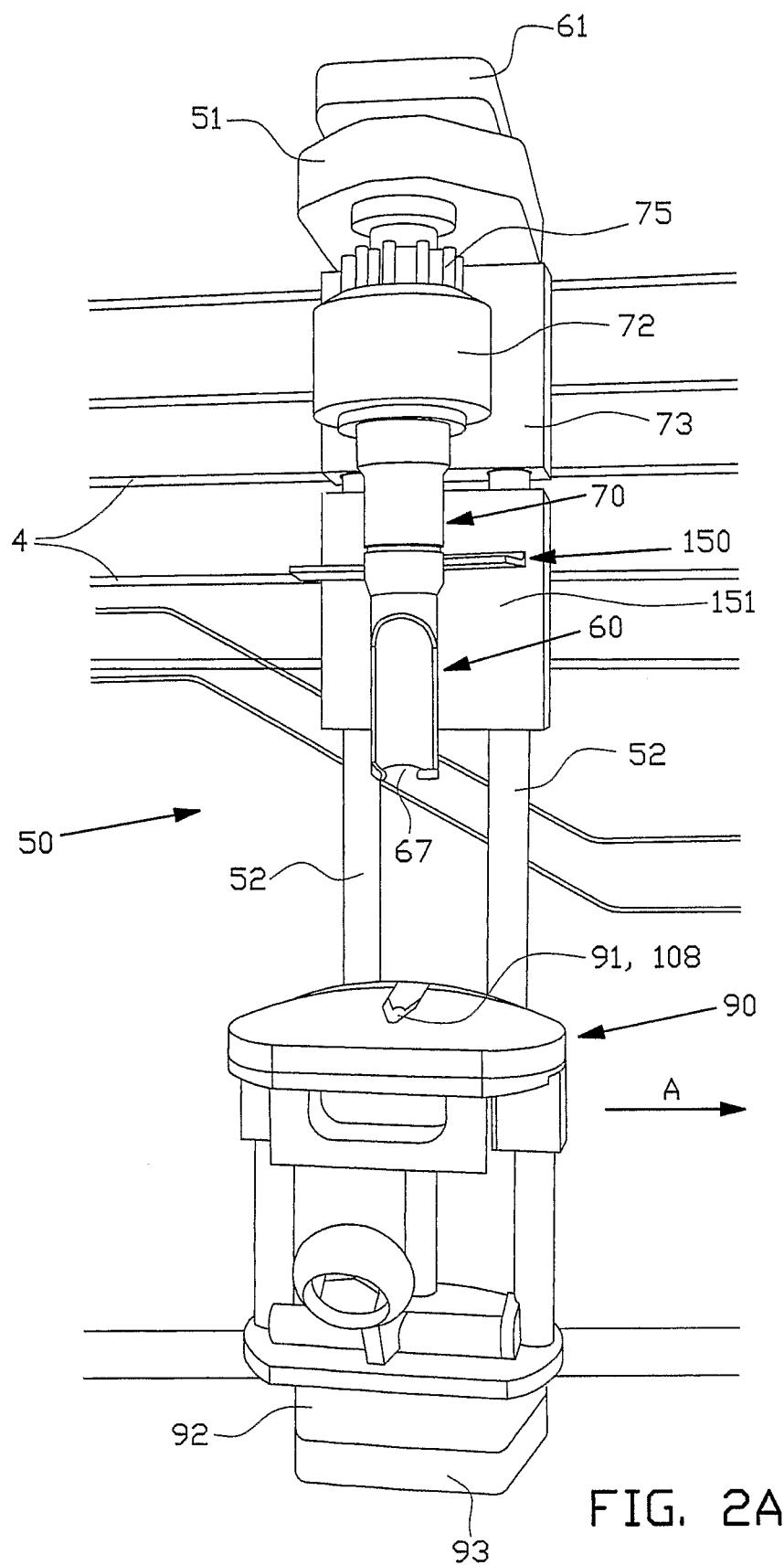
FIGS. 2A and 2B show a front view in perspective and a side view of a deboning unit according to FIGS. 1A and 1B.
Figure 2B:
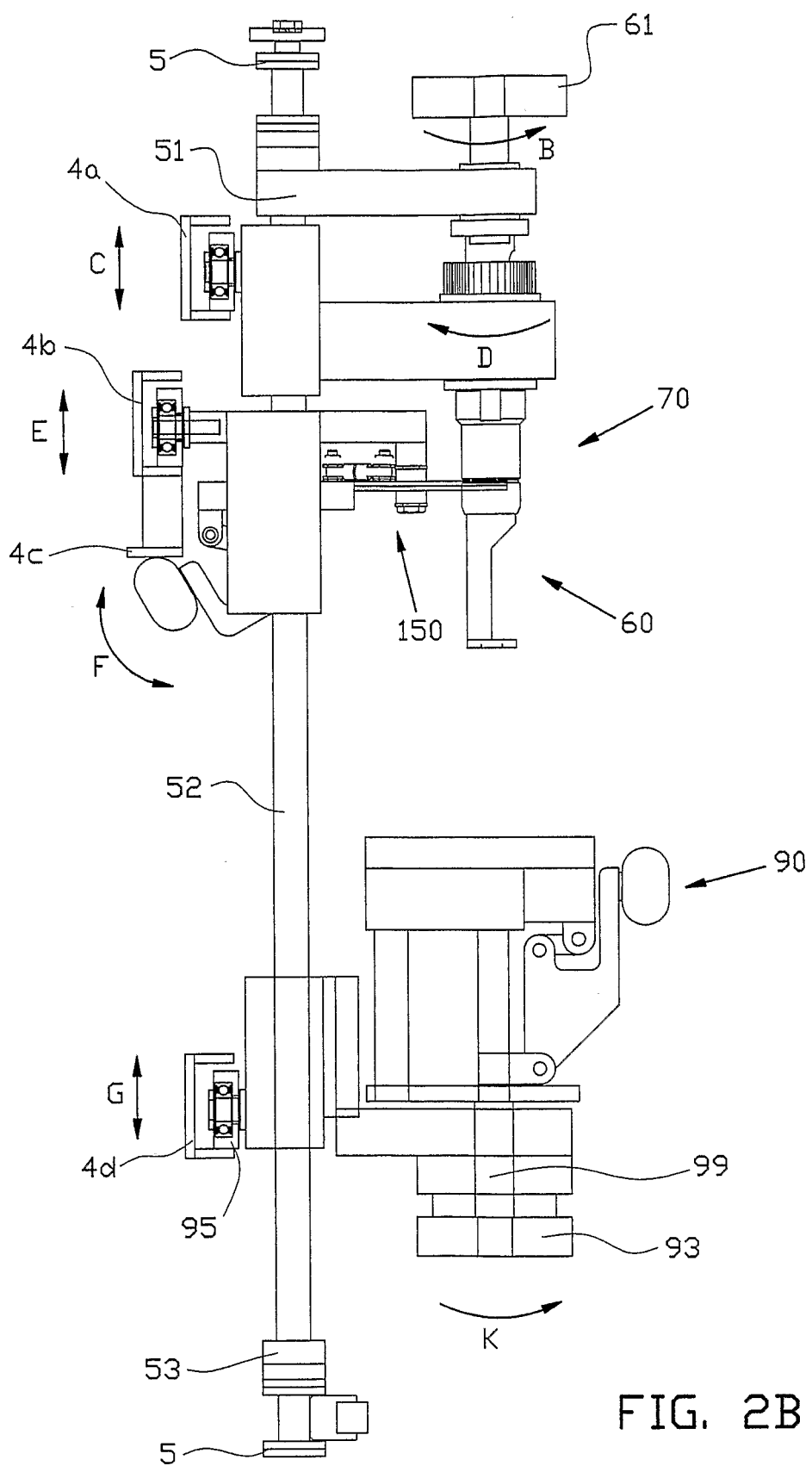

The deboning unit 50 shown in FIGS. 2A and 2B comprises two vertical guides 52 that have been attached to the chains, an upper support 51 fixedly connected to the guides 52, an ankle knuckle holder 60 at the upper support 51, an all round cutter 70, a stripper 150 and a hip knuckle holder 90.

A part of the hip knuckle holder 90 (second holder) is also shown in FIGS. 3A-3D. The hip knuckle holder 90 comprises a carriage 94 that is movable in vertical direction G along the guide bars 52 by an operating roller 95, a horizontal support 92 at the carriage 94, a metal base 98 with a vertical shaft 99 which is bearing mounted in the support 92 so as to be rotatable, and a rotary block 93 at the shaft 99 for rotation of the base in direction K (see FIG. 8F). A synthetic support block 100 is attached on the base 98, the support block having parallel horizontal passages in which metal guides 104 of a synthetic slide block 103 have been slidably accommodated. A metal support plate 117 having a synthetic attachment plate 110 thereon is attached on the slide block 103, which synthetic attachment plate rests on a metal support plate 118 on the support block 100. The attachment plate 110 comprises a slot 121 extending in the slide direction Z for a complementary formed, elongated synthetic closing piece 109. The closing piece 109 is attached on an elongated elevation 119 of the support plate 118. In the attachment plate 110 and the closing piece 109 lowerings 91 have been formed that together form a bowl-shaped recess, which in the centre merges into a through opening 108 in line with the shaft 99. The support plates 117, 118 have been provided with cutting or scraping edges 116, 167 which protrude to the inside at the bottom side of the lowerings 91.

The curve path 4D for the operating roller 95 of the hip knuckle holder 90 preferably is fully adjustable as regards height in order to adjust the distance between the hip knuckle holder 90 and the ankle knuckle holder 60 that as regards height is fixed, for various lengths of chicken legs 200.

Figure 3A:
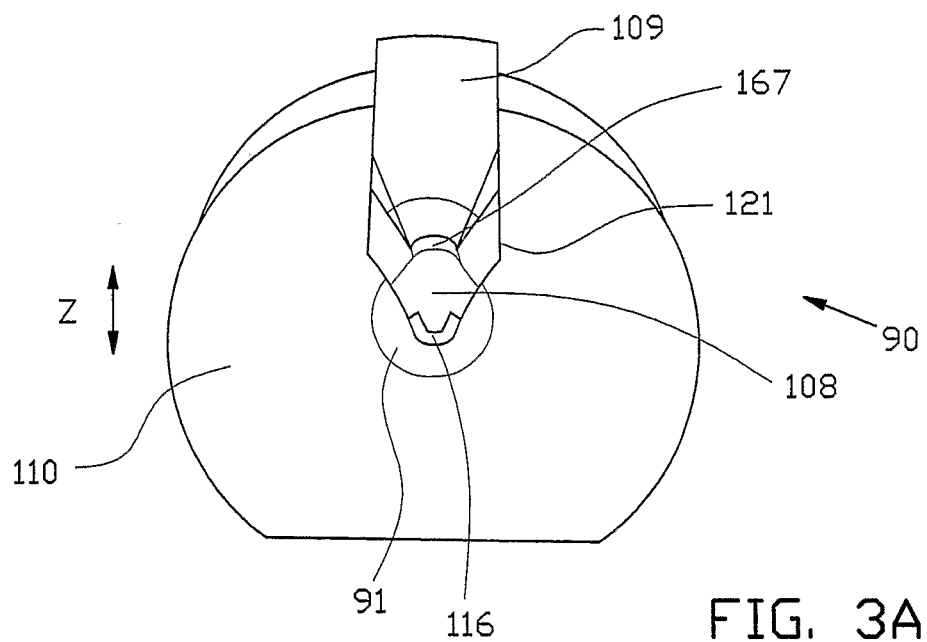
FIG. 3A shows a top view in perspective of the hip knuckle holder of the deboning unit according to FIGS. 2A and 2B.
Figure 3B:
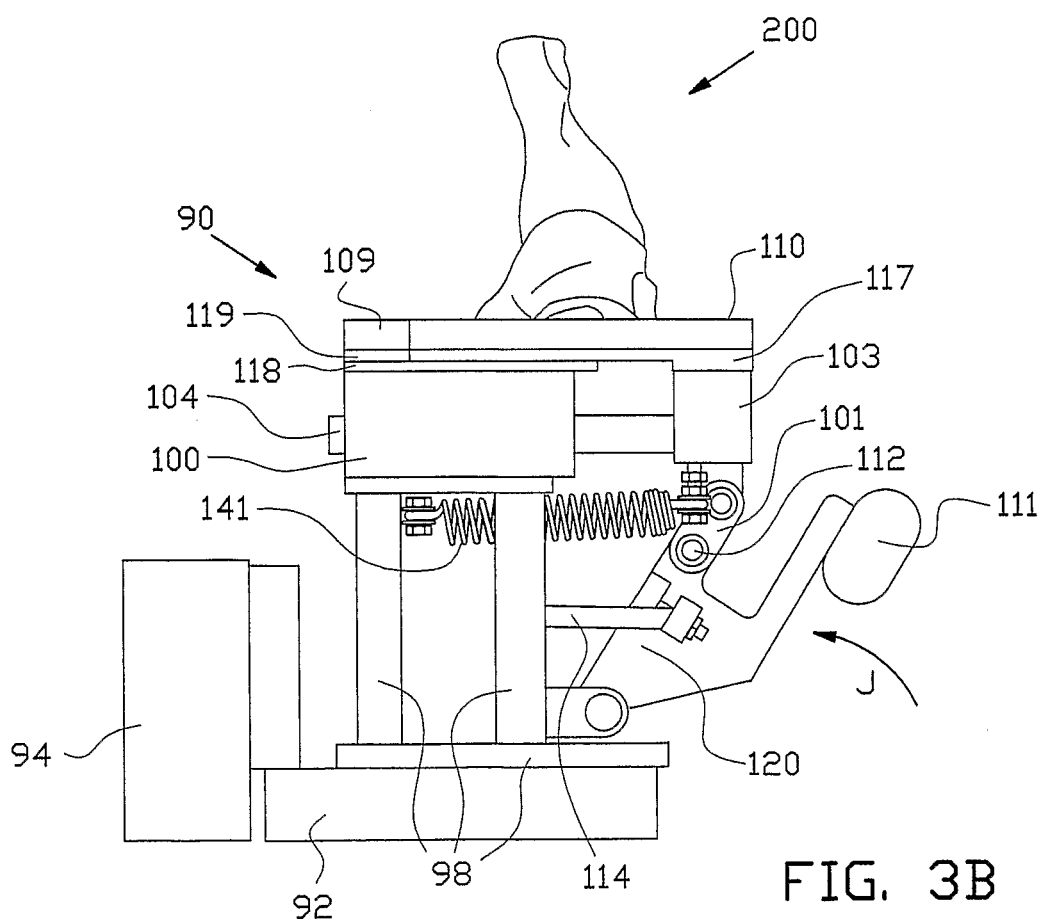
FIGS. 3B-3D show side views of the table according to FIG. 3A, in the opened position according to FIG. 3A, a semi-closed position, and a fully closed position, respectively.
Figure 3C:
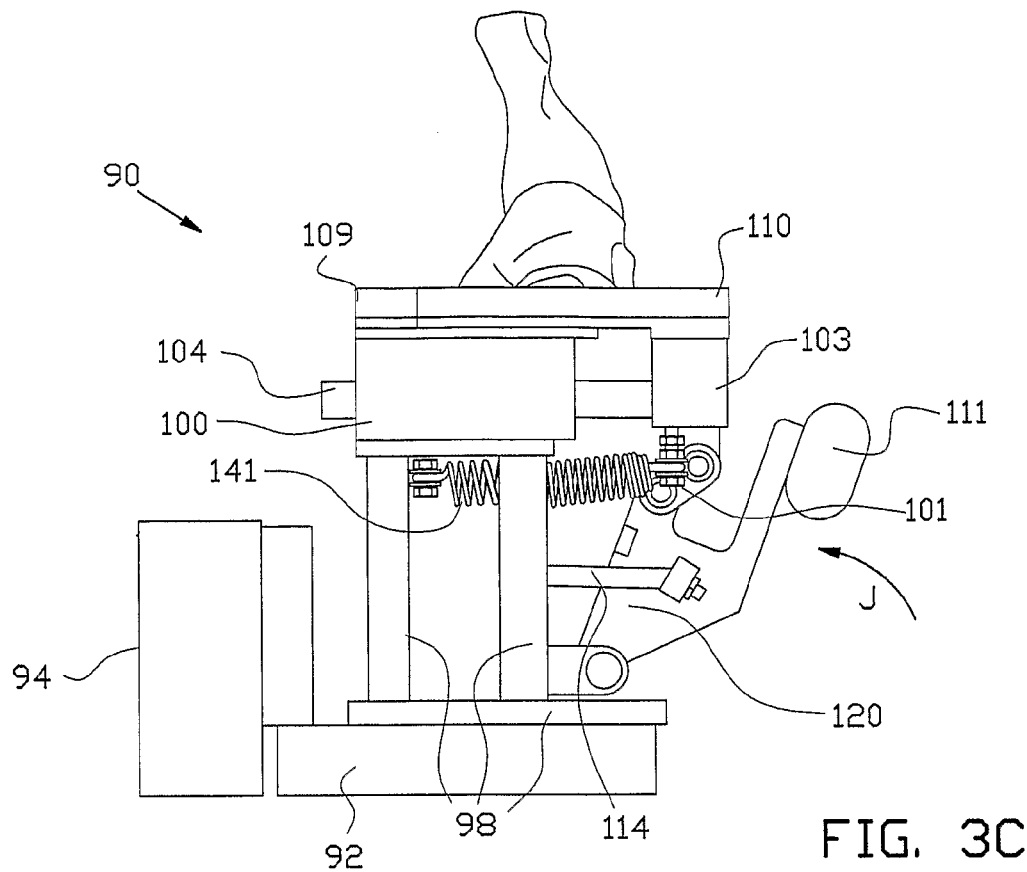
Figure 3D:
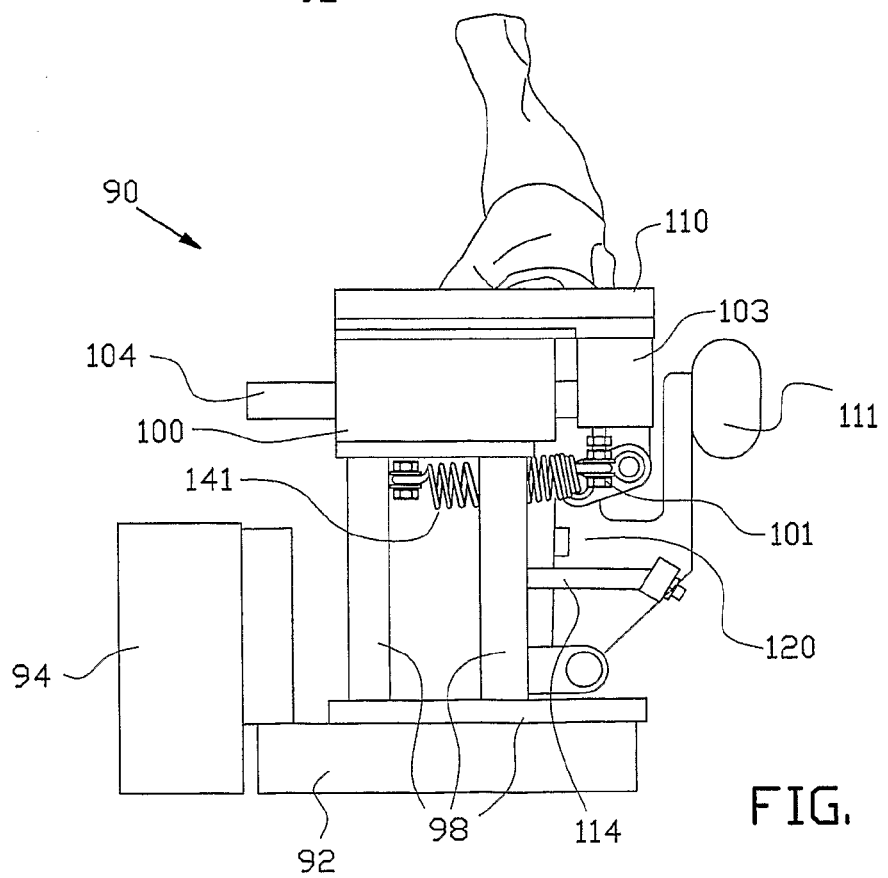

The base 98 comprises a first hinge arm 120 which with a hinge 112 is connected to a second hinge arm 101 below the slide block 103. The first hinge arm 120 comprises an operating roller 111 spaced apart from the hinge 112. The slide block 103 is pre-biassed by means of draw springs 141 towards the support block 100. In the opened position as shown in FIGS. 3A and 3B the hinge arms 101, 120 are stably in line with each other, resting against a stopper 114. By operating the roller 111 and thus the first hinge arm 120 in direction J upwards, the hinge arms 101, 120 buckle to the inside as shown in FIG. 3C, as a result of which the hip knuckle holder 90 forcefully enters the closing position as shown in FIG. 3D. The attachment plate 110 then fittingly accommodates the closing piece 109 more deeply into the slot 121 in direction Z.

Figure 4A:
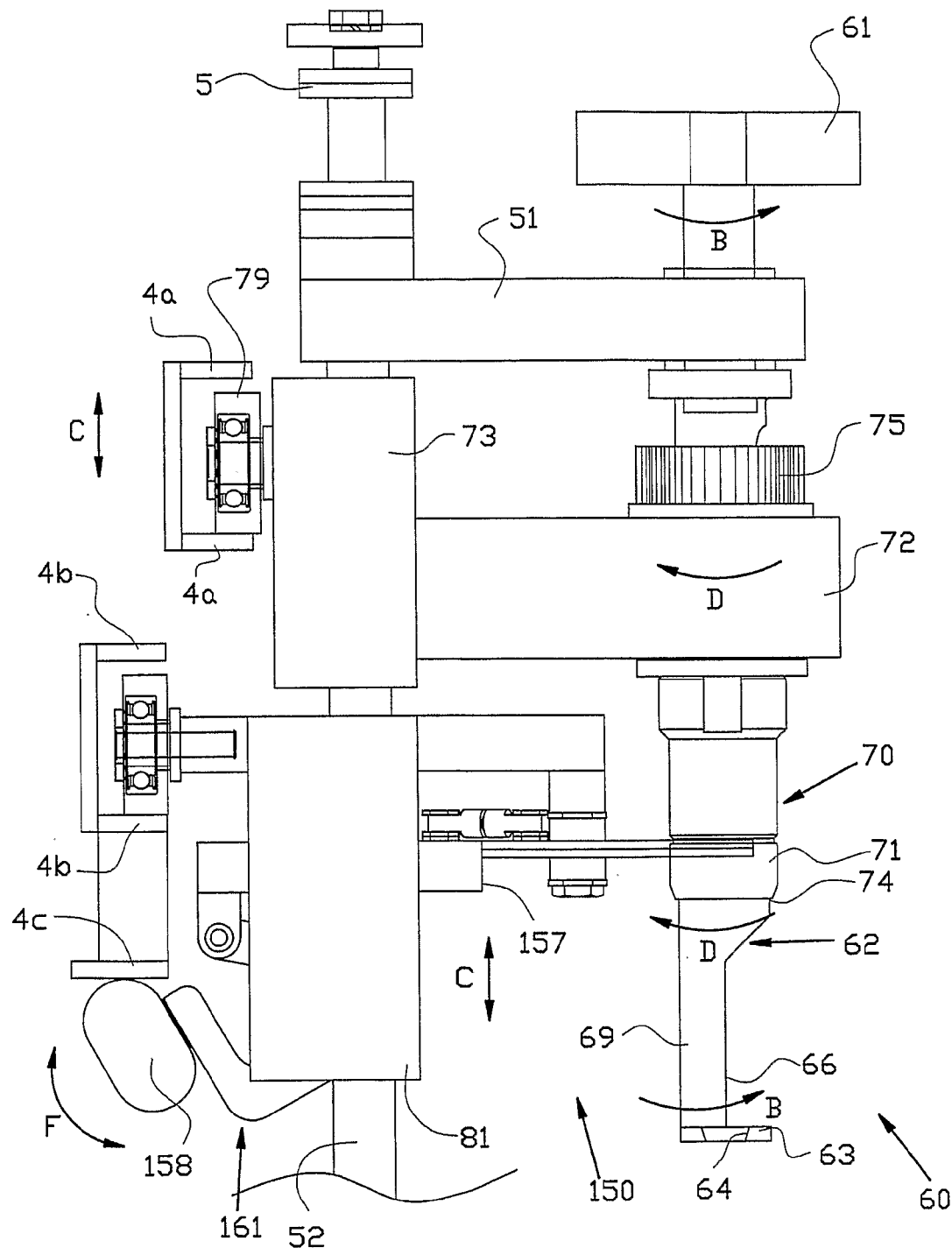
FIGS. 4A and 4B show a side view and a front view of the top side of the deboning unit according to FIGS. 2A and 2B.
Figure 4B:
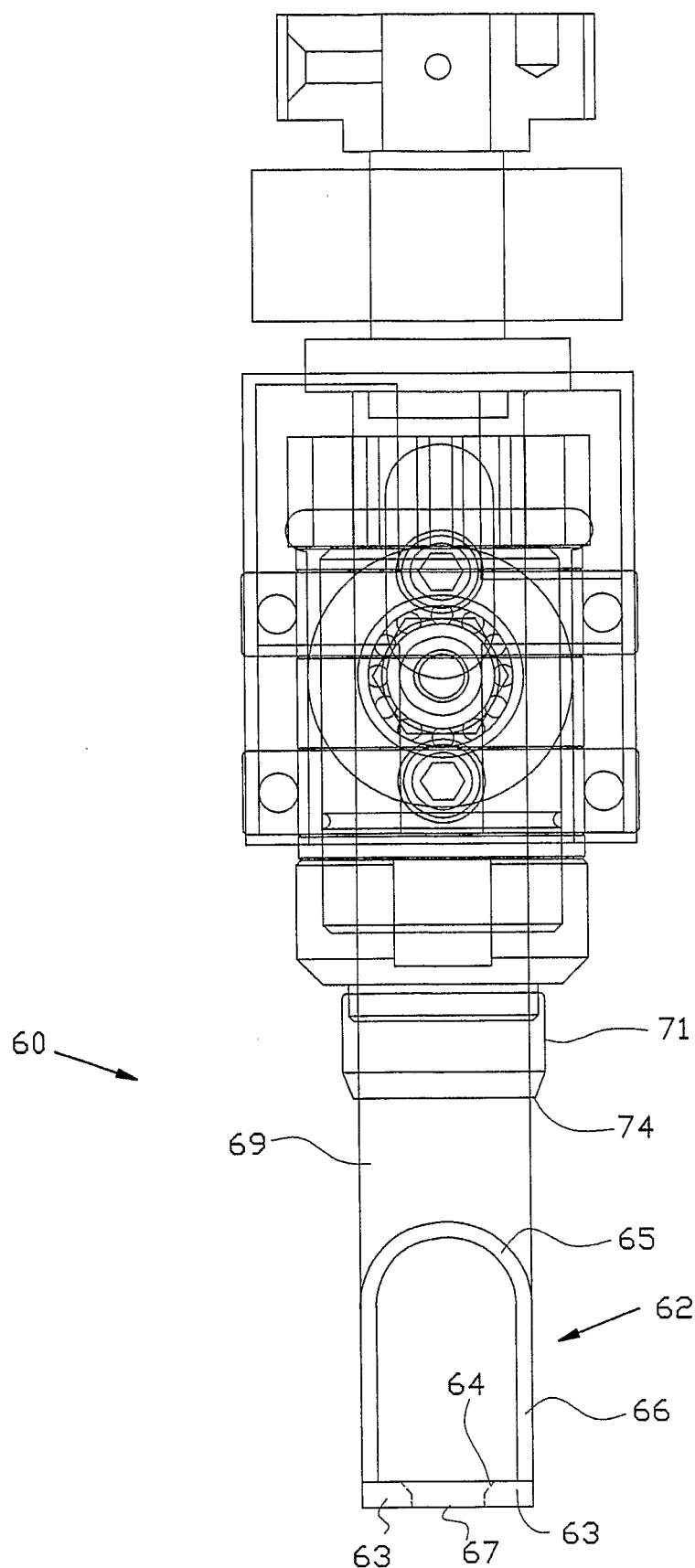

The ankle knuckle holder 60 as shown in FIGS. 4A and 4B comprises a hollow, vertically positioned metal tube 69 that is bearing mounted in the upper support 51 so as to be rotatable. At the lower end of the tube 69 a recess 62 has been formed in the wall. Said recess 62 contains an inclined portion 65 that merges into a straight portion 66 having a depth equalling half the diameter of the tube 69. Due to this recess 62 two horizontally extending attachment claws 63 have been formed (first holding means of first holder) at the lower side. Said attachment claws 63 have been provided with a bevelling 64 at the inside. The attachment claws 63 form a U-arrangement and at their ends keep a passage opening 67 free for passage of a narrowed portion behind the ankle knuckle of a chicken leg. The attachment claws 63 may alternatively form a C-arrangement. The height of the recess 62 is larger than the size of an ankle knuckle of a chicken leg. At the upper end of the tube 69 a rotary block 61 has been attached that corresponds with the rotary block 93 of the hip knuckle holder 90 for rotation of the tube 69 in direction B about a vertical axis.

The round cutter 70 as shown in FIGS. 4A and 4B comprises a carriage 73 which is slidable in vertical direction C about guides 52, an operating roller 79 for sliding the carriage 73, a support 72 at the carriage 73, and a cylinder blade 71 (second holder means of first holder) that is bearing mounted in the support 72 so as to be rotatable. The cylinder blade 71 is situated around the tube 69 of the ankle knuckle holder 60. At the side facing the hip knuckle holder 90, the cylinder blade 71 has a circumferential, even cutting edge 74. The cutting edge 74 has been formed by sharpening the cylinder blade 71 inclined all round from the outside. Alternatively the cutting edge 74 can be sharpened all round from the inside. The diameter of the cylinder blade 71 exceeds the size of the upper edge of the bowl-shaped lowerings 91 in the attachment plate 110. At the upper side the cylinder blade 71 comprises a toothed wheel 75 able to mesh with a gear rack (not shown) positioned stationary along the conveyor track, for rotation of the cylinder blade 71 in direction D about its vertical axis.

Figure 5A:
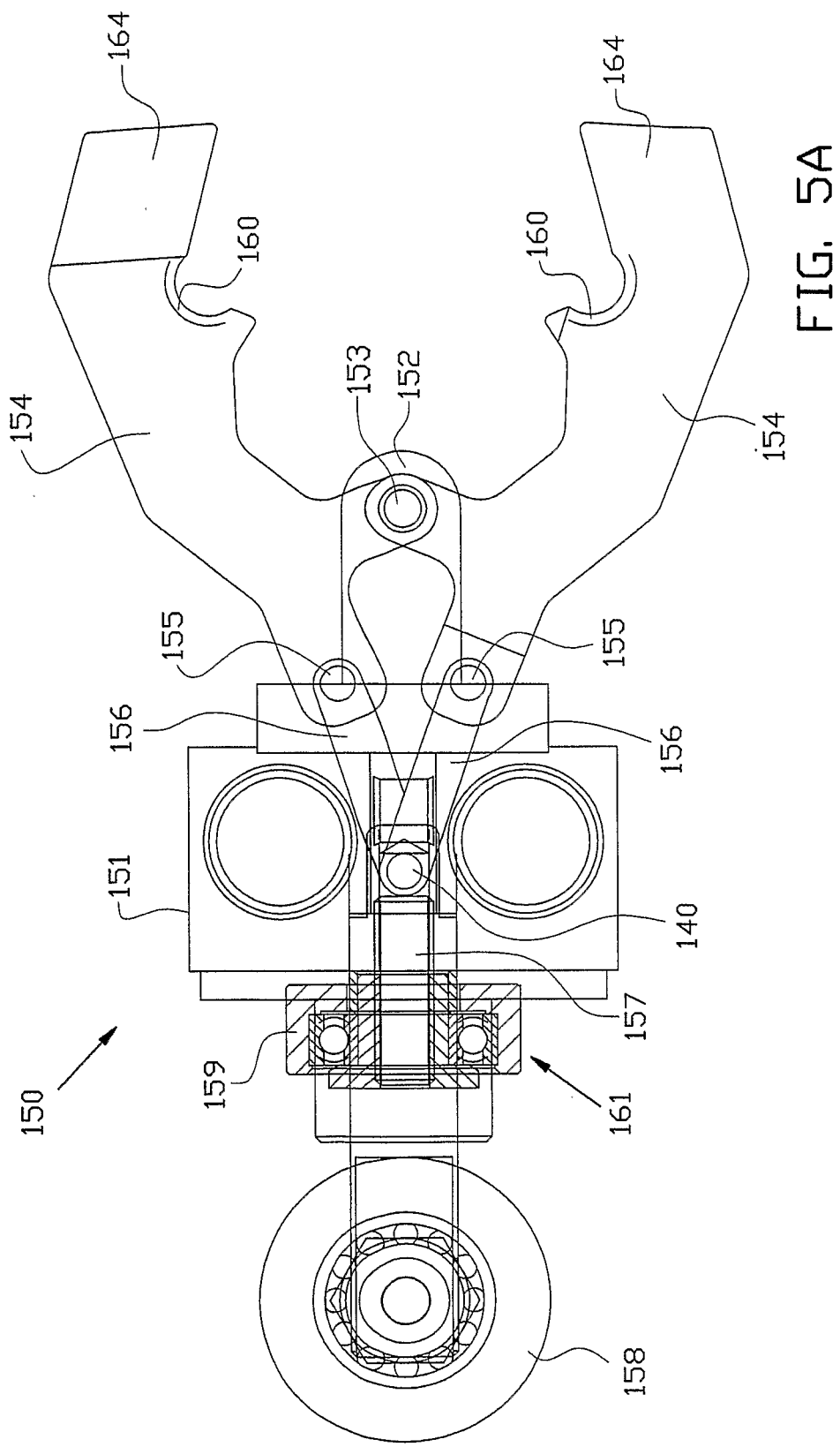
FIGS. 5A and 5B show a bottom view of the stripping claws of the deboning unit according to FIGS. 2A and 2B, in an opened and a closed position.
Figure 5B:
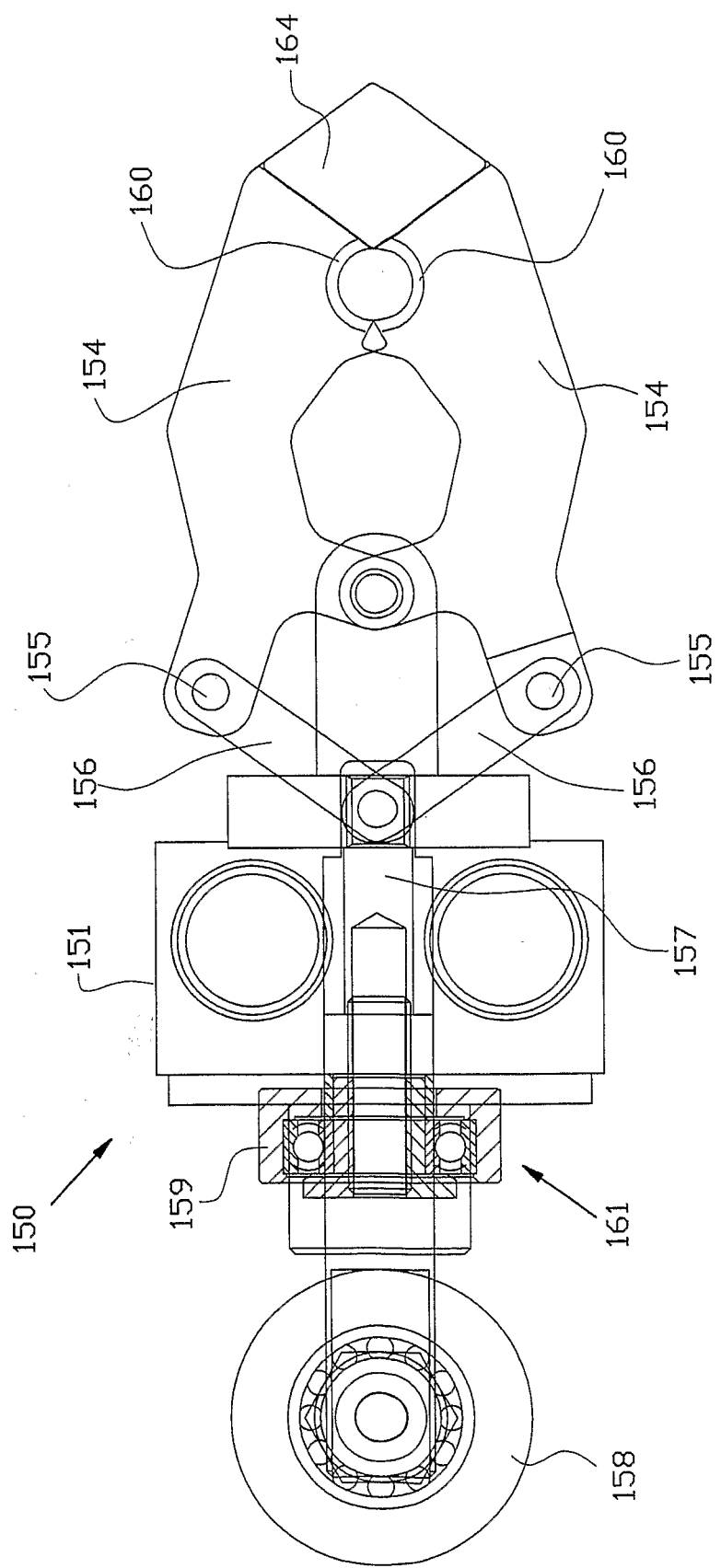

The stripper 150 as shown in FIGS. 5A and 5B comprises a carriage 151 which in vertical direction E is slidable along the guide bars 52, a first operating roller 159 for sliding the carriage 151, a support 152 at the carriage 151, and two plate-shaped stripping claws 154 which in a horizontal plane can be hinged about a common hinge 153 below the end of the support 152. Spaced from the common hinge 153 each stripping claw 154 comprises a hinge 155 for operating arms 156, wherein the operating arms 156 come together at a hinge point 140 of a central operating arm 157 horizontally movable along the support 152. Said operating arm 157 is movable in a horizontal direction by means of a movement mechanism 161 having a second operating roller 158, wherein an upward motion of the operating roller 158 in the direction F (see FIG. 2B) leads to the stripping claws 154 moving towards each other from the opened position according to FIG. 5A to the closed position according to FIG. 5B. The ends of the stripping claws 154 have been shaped such that in closed position they come to lie one above the other with end plates 164 in order to counteract the stripping claws 154 moving vertically apart under the influence of vertical stripping forces. Behind the end plates 164 the stripping claws 154 comprise semicircular recesses 160 with finished inner edges.

Figure 6A:
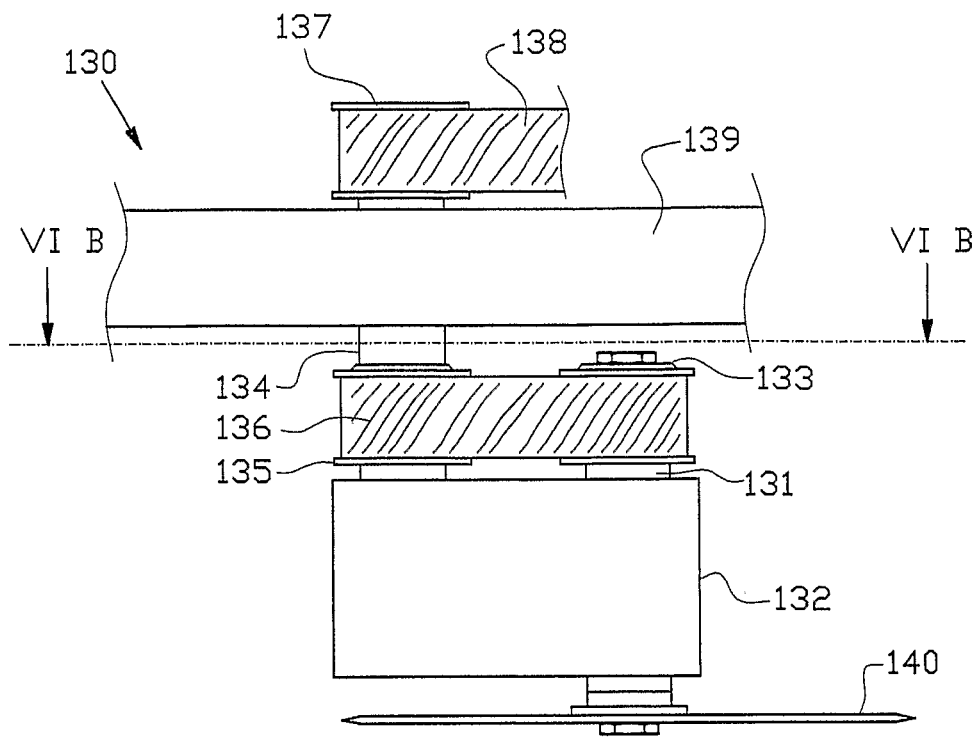
FIGS. 6A and 6B show a side view and a top view of one of the circular blades of the deboner according to FIG. 1A as positioned along the path of the deboning unit according to FIGS. 2A and 2B.
Figure 6B:
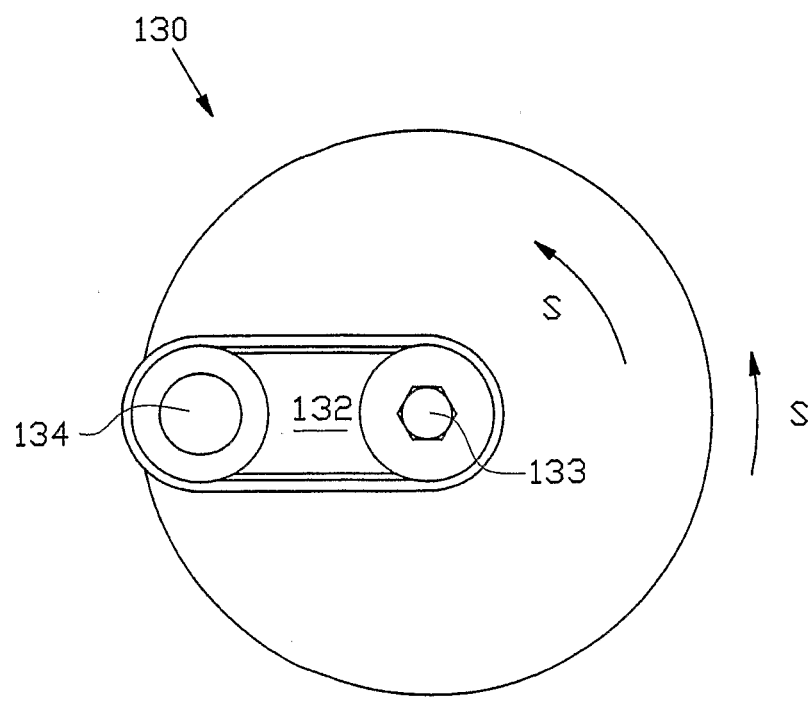

FIGS. 6A and 6B show a part of the longitudinal cutter 130. The longitudinal cutter 130 comprises a horizontal beam 139 in which a total of four vertical drive shafts 134 have been bearing mounted. The drive shafts 134 at the upper side comprise a first pulley 137 that are in contact with a belt 138 for driving the drive shafts 134 in a same direction of rotation by means of an electromotor (not shown). At the bottom side the drive shafts 134 have been bearing mounted in a swivelling arm 132, wherein above the swivelling arm 132 a second pulley 135 is situated about the drive shaft 134. Parallel and spaced apart from the drive shaft 134 a second shaft is bearing mounted in the swivelling arm 132, which second shaft at the upper side is provided with a third pulley 133 and at the bottom side with a horizontally positioned circular blade 140. A synthetic belt 136 is situated around the second and third pulley 135, 133. Due to rotation of the drive shaft 134 in direction S, the circular blade 140 is rotated in the same direction S and simultaneously due to the friction of/in the belt 136 and/or the arrangement of bearings in the swivelling arm 134 is driven in the direction of the conveyor track. The driving force towards the conveyor track may also occur due to the mass inertia of the circular blade 140, for instance at accelerating (again) after having been decelerated as a result of cutting.

Figure 7A:
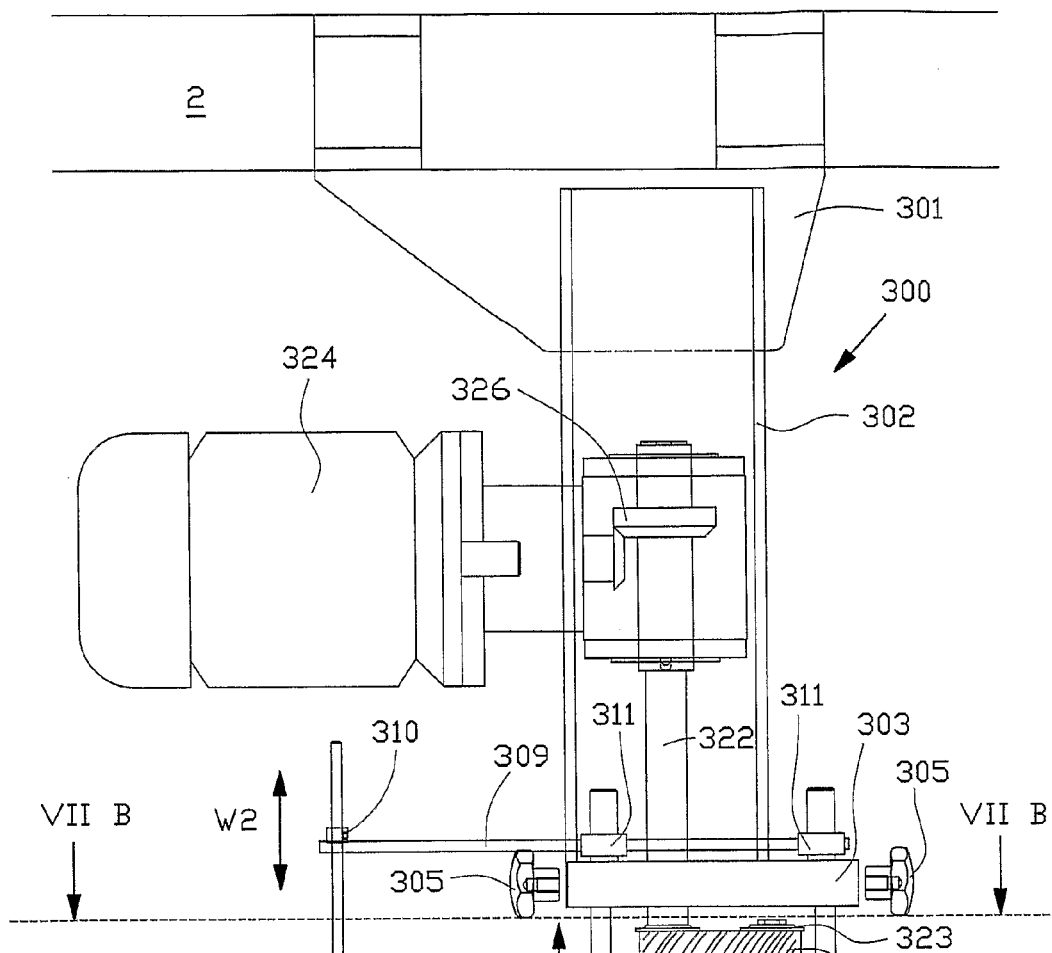
FIGS. 7A and 7B show a side view and a top view, respectively, of a cross-section of a knee capsule cutter of the deboner according to FIG. 1B as positioned along the part of the deboning unit according to FIGS. 2A and 2B.
Figure 7B:
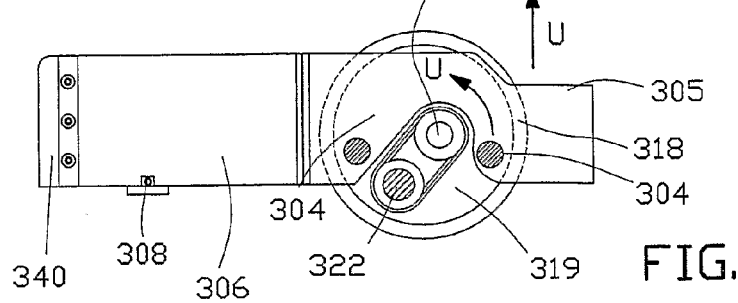

The knee capsule cutter 300 as shown in FIGS. 7A and 7B is intended to cut into or through knee capsule 210 that is situated over knee cap (not further shown) at the location of the knee joint 202. The knee capsule consists of several tendons which at the location of the thigh change into muscle tissue.

The knee capsule cutter 300 comprises a mounting part 301 that is connected to a vertical U-profile 302, a horizontal support 303 at the end of the U-profile 302, a first elongated, plate-shaped lifting track 306 having a synthetic scraping edge 340, which is hinged to a second horizontally extending elongated plate-shaped lifting track 305, and two vertical bars 304 which at the bottom side have been connected to the second lifting track 305 and which at the upper side extend through the support 303. At the upper side the vertical bars 304 are connected by means of intermediate pieces 311 to a horizontal bar 309.

A vertical bar 308 extends through the end of the horizontal bar 309. At the upper side the vertical bar 308 is provided with a stop 310 resting on the horizontal bar 309, and at the bottom side is connected by means of a hinge 307 to a first lifting track 305. The angle between the first and the second lifting track 306, 305 is adjustable by sliding the stop 310 along the vertical bar 308, as a result of which the position of the vertical bar 308 can be adjusted in direction W2. The stop 310 allows an upward motion of the end of the first lifting track 306 in direction X. The height of the first and second lifting track 306, 305 in vertical direction W1 is jointly adjustable by sliding the vertical bars 304, which by means of adjustment screws 305 have been locked within the horizontal support 303.

The knee capsule cutter 300 has a horizontal circular blade 319 that is positioned under the second lifting track 305. The circular blade 319 is attached to a vertical shaft 320 that is bearing mounted in a swivelling arm 321. In the swivelling arm 321a vertical drive shaft 322 is bearing mounted, which by means of a transmission 326 is connected to an electromotor 324. The shafts 320, 322 have both been provided with a pulley 323, 325. A synthetic belt 136 is situated around the pulleys 323, 325. Due to rotation of the drive shaft 322 in direction U the circular blade 319 is rotated in the same direction U and simultaneously due to the friction of/in the belt 136 and/or the arrangement of bearings in the swivelling arm 321 is driven in the direction U towards the conveyor track. The cutting edge 318 of the circular blade 319 then protrudes in vertical projection from the second lifting track 305. The drive force towards the conveyor track may also arise due to the mass inertia of the circular blade 319, for instance at accelerating (again) after having been decelerated as a result of cutting. The process of deboning a chicken leg with the deboner 1 is shown in the FIGS. 8A-8L. In this process both the drum stick and the thigh of the chicken leg are deboned, that means the whole leg. Beforehand the meat of this chicken leg is incised longitudinally down to the bone at the inside, as a result of which the meat acquires a more or less square contour after the process.

Figure 8A:
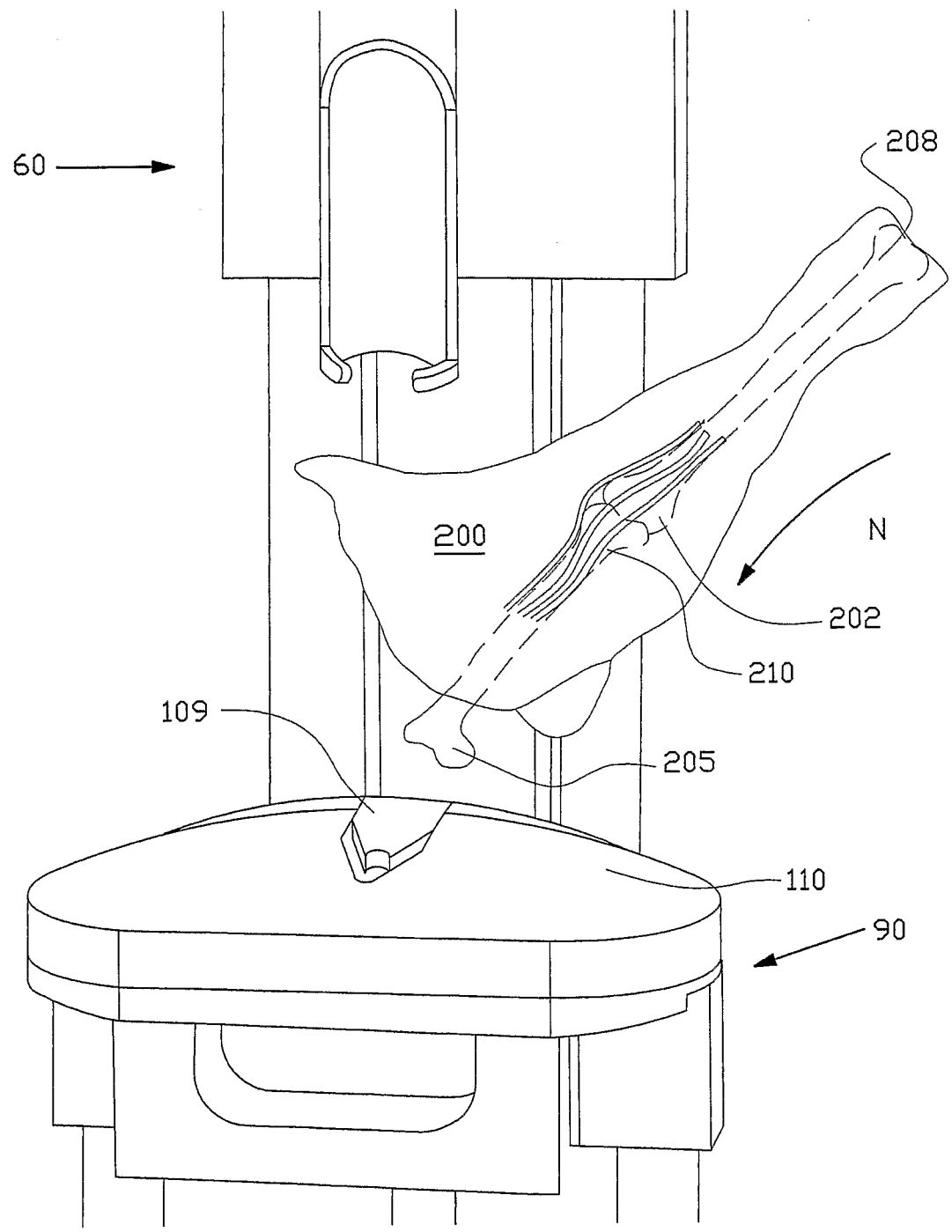
FIGS. 8A-8H and 8J-8L show consecutive process steps for deboning a chicken leg using the deboner as shown in FIGS. 1A-7B.
Figure 8B:
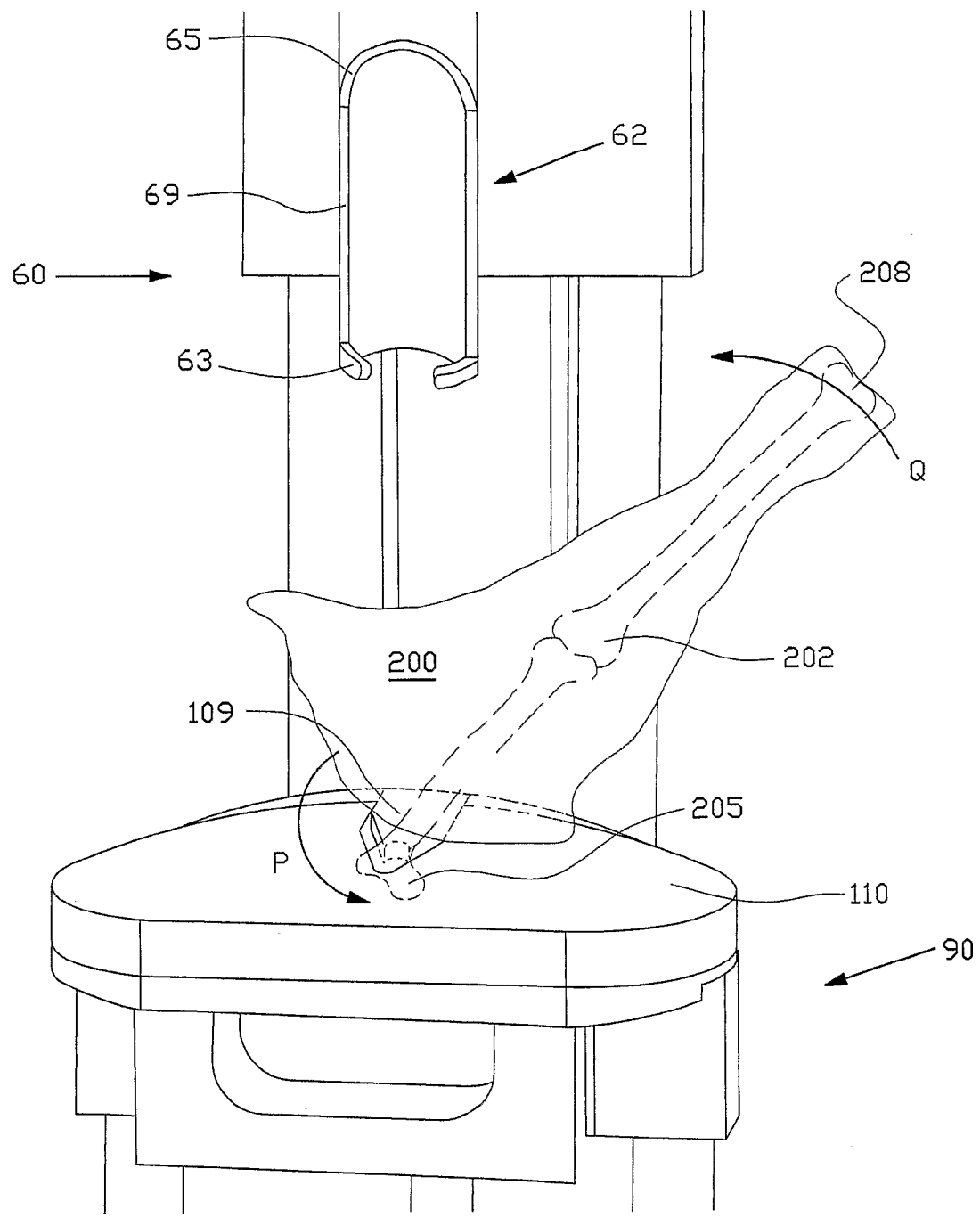
Figure 8C:
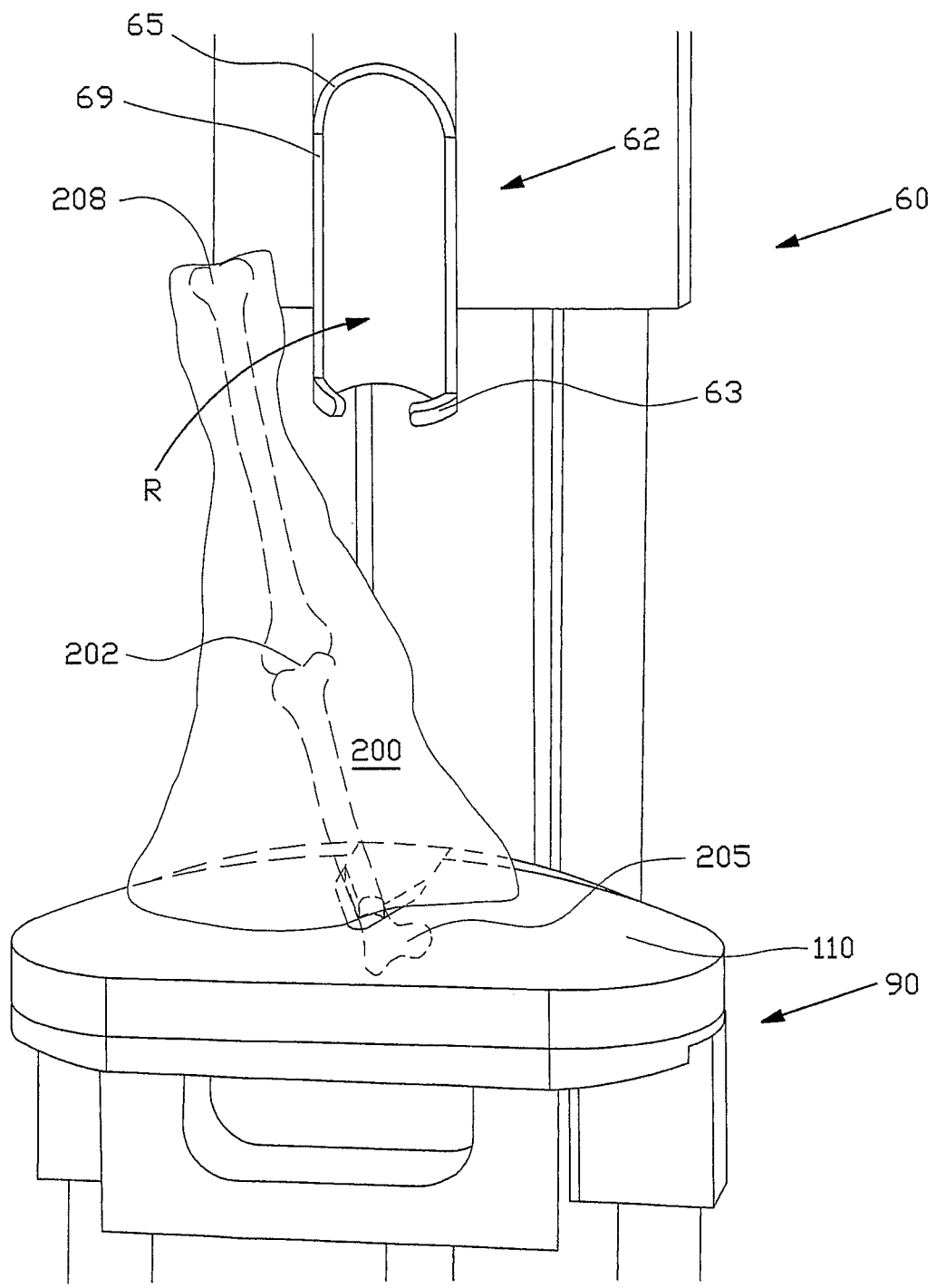
Figure 8D:
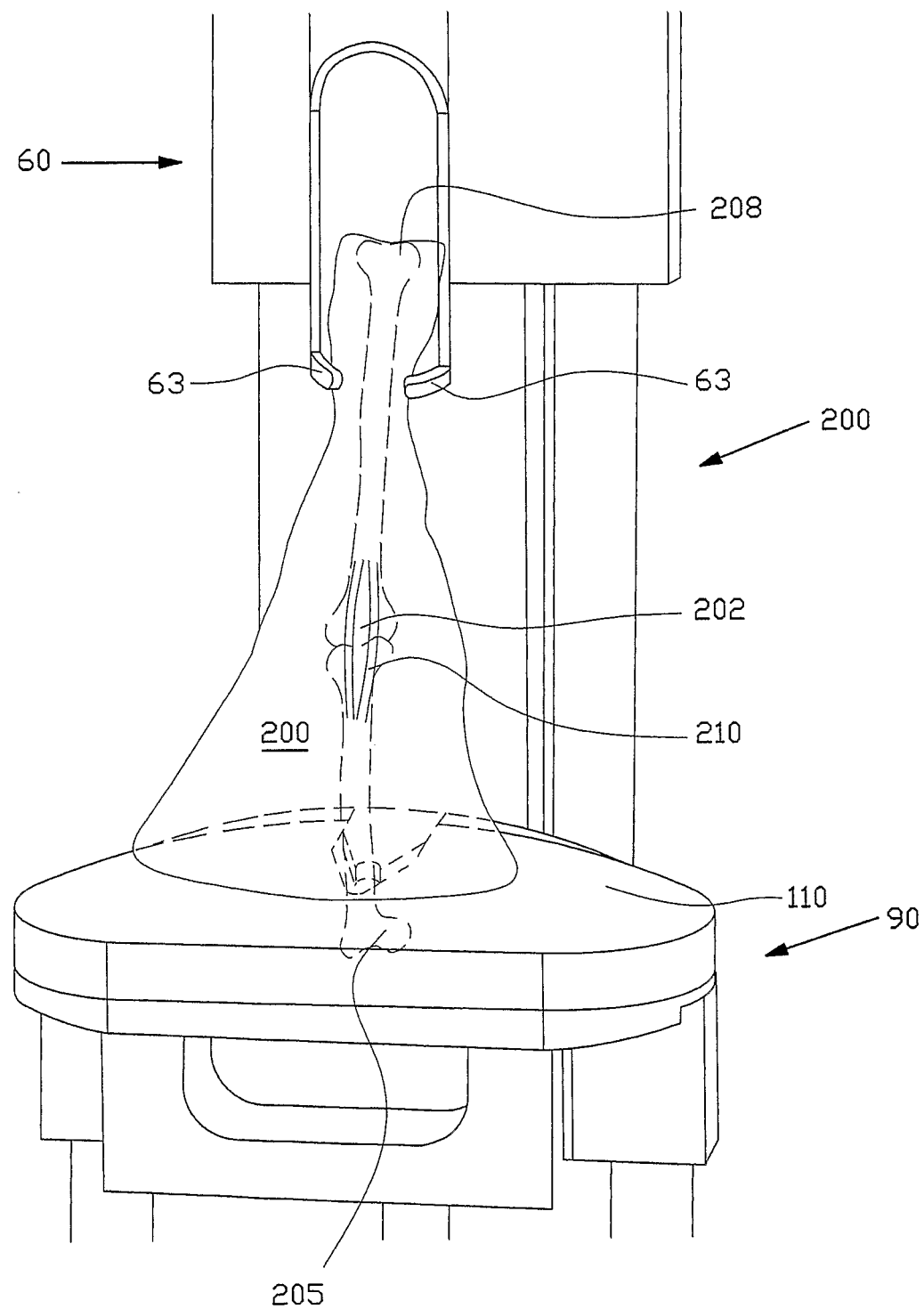

The deboning unit 50 as shown in FIG. 8A at the start of the process moves in transport direction A along the placement section 81, in which the hip knuckle holder 90 is opened, the cylinder blade 71 is above the recess 62 in the tube 69, and the stripping claws 154 are in the opened position above the cutting edge 74 of the cylinder blade 71. The chicken leg 200 is now brought in an inclined position and oriented with the hip knuckle 205 diagonally downward and in direction N brought to the hip knuckle holder 90. Subsequently, as shown in FIG. 8B, the hip knuckle 205 is hooked in direction P behind the opening 108 in the attachment plate 110, after which the chicken leg 200 is erected in direction Q until in front of the attachment claws 63 of the ankle knuckle holder 60. After that the chicken leg 200 is pulled slightly upward in order to stretch the knee joint 202, so that the ankle knuckle 208 in direction R can be placed in the recess 62 as shown in FIG. 8C. By releasing the chicken leg 200, the ankle knuckle 208 drops against the attachment claws 63 as shown in FIG. 8D. The knee joint 202 also remains stretched due to the form-closed confinement in the still opened attachment plate 110. Due to the symmetry in a notional vertical plane through the passage opening 108 and transverse to the transport direction A, the deboning unit 50 is suitable for both left and right legs. The knee capsule 210 is then located at the side of the knee joint 202 facing away from the guides 52.

The deboning unit 50 subsequently moves along the clamping section 82. By following the curve paths 4a-4d, the cylinder blade 71 here moves downward over the tube 69, until the attachment claws 63 have been accommodated in the cylinder blade 71. As a result the ankle knuckle 108 is confined behind the attachment claws 63 in the cylinder blade 71. In this section the attachment plate 110 is moved towards the closing piece 109, as a result of which the hip knuckle 205 is confined under the attachment plates 110 and the closing piece 109. After that the hip knuckle holder 90 is moved several centimeters downward, as a result of which the knee joint 202 is stretched further.

Figure 8E:
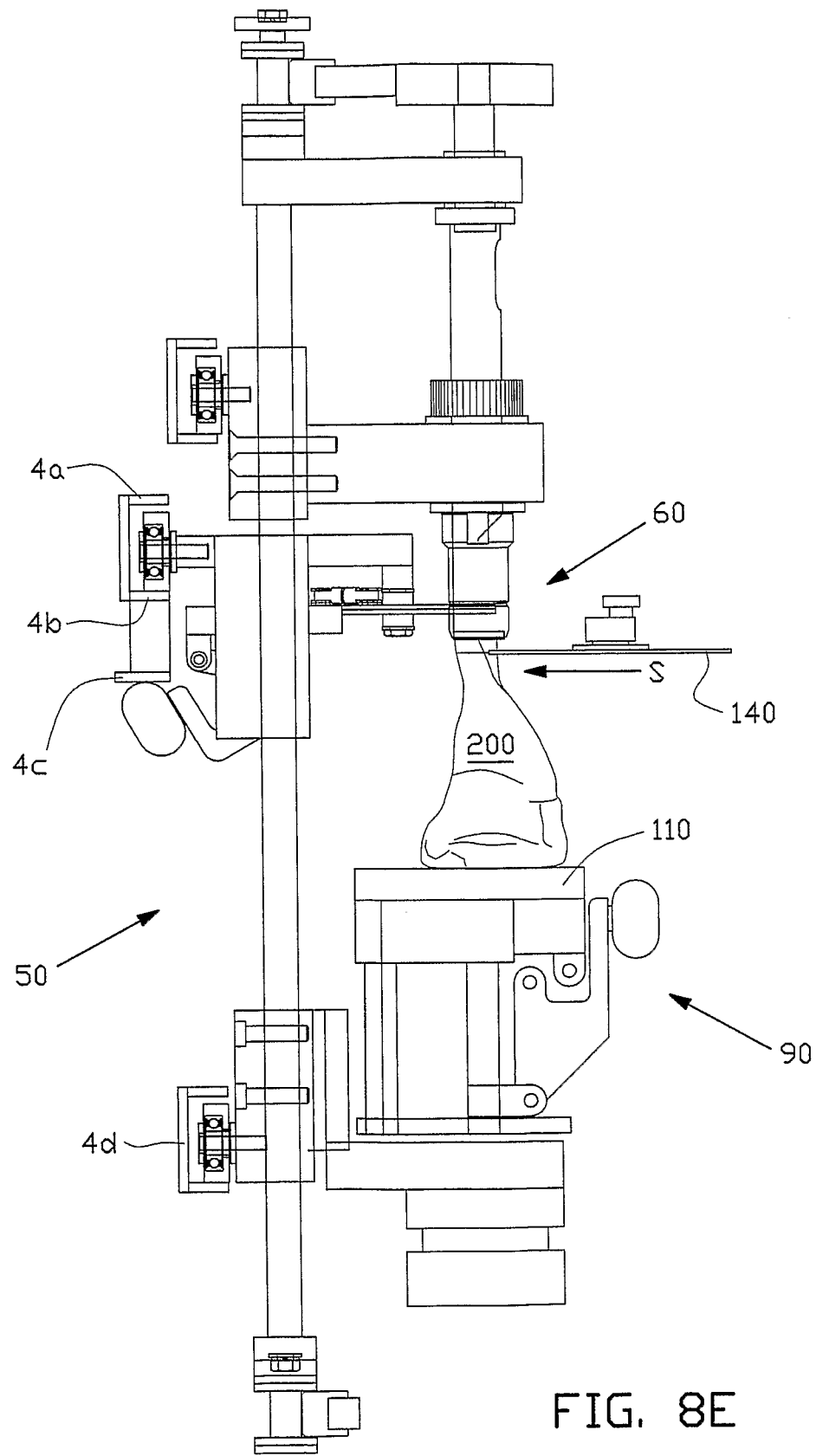
Figure 8F:
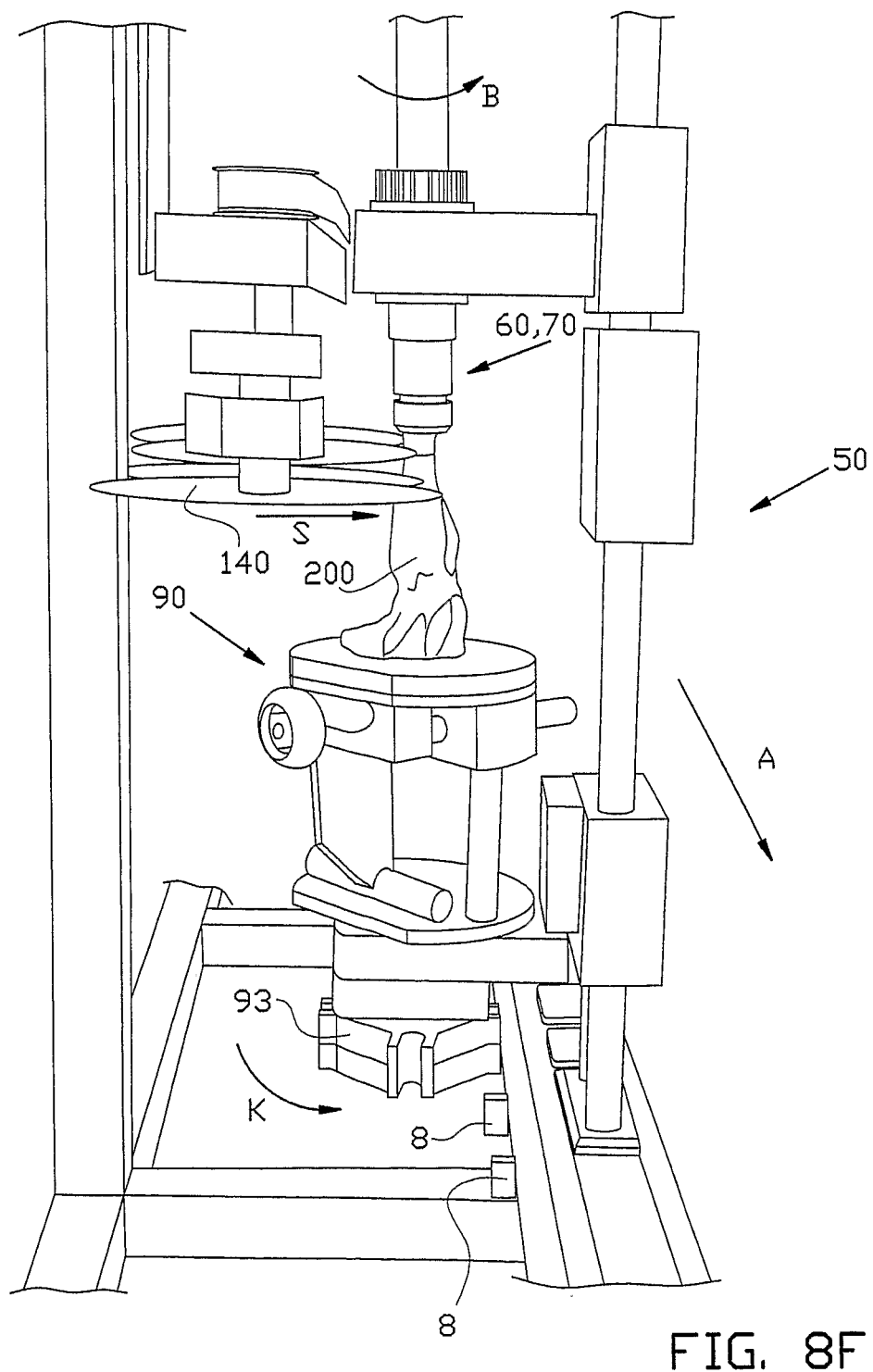

After clamping the transverse cutting section 83 is run through in which, as shown in FIG. 8E, the deboning unit 50 moves along the circular blades 140. The circular blades 140 here rotate with the cutting edge in direction S counter the transport direction A. The circular blades 140 are positioned such that they cut through the tendons and muscles behind the ankle knuckle 208 down to the bone. Due to the slight pressure force in the resilient suspension of the circular blades 140, the bone is only lightly touched by the cutting edge of the circular blades 140. As shown in FIG. 8F the rotary blocks 61 and 93 are each time turned a quarter of a turn in the direction B and K by the stationary teeth 8 along the conveyor track, as a result of which each time more than a quarter of the cut around a bone is made.

Figure 8G:
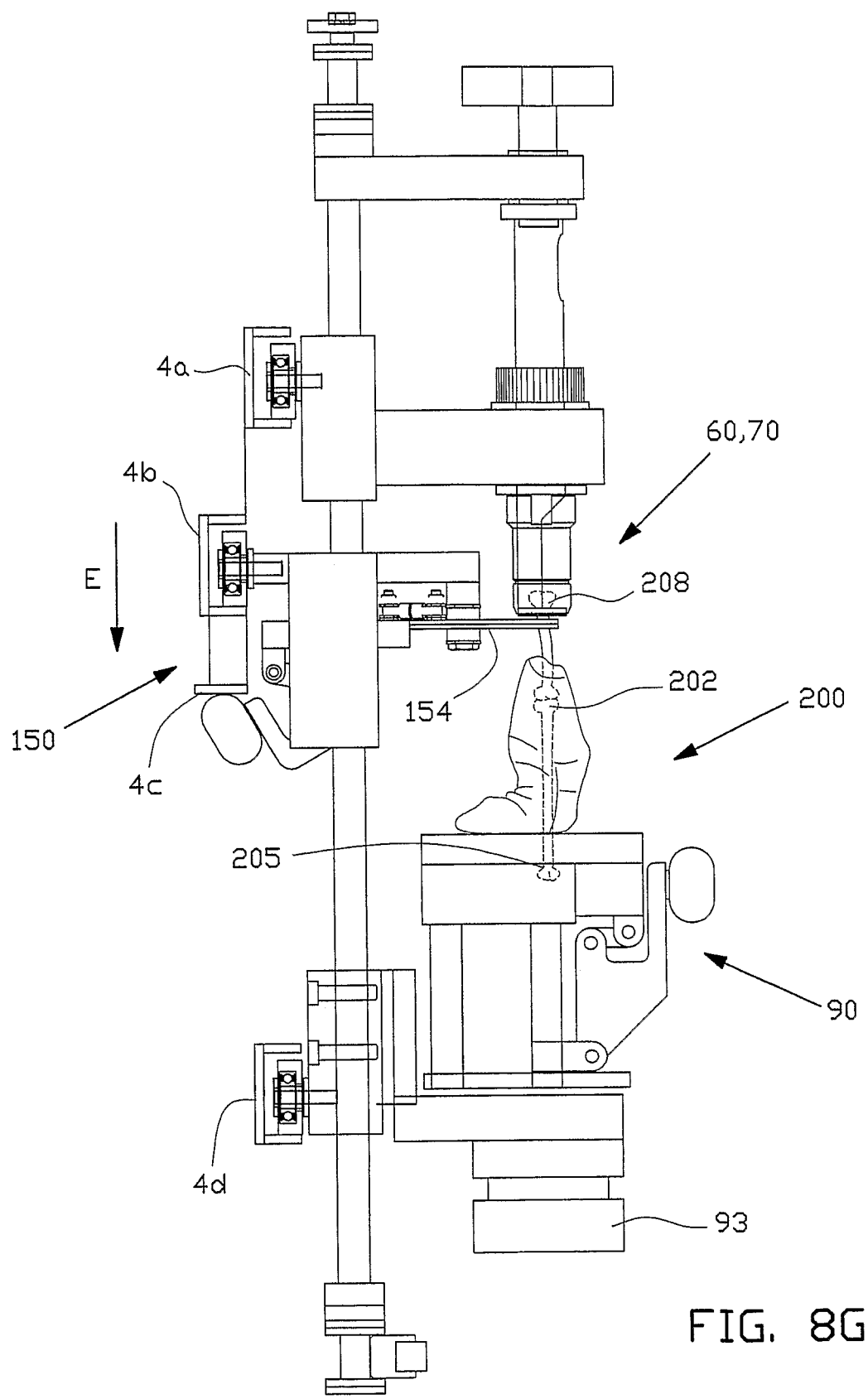

After the longitudinal cutting the deboning unit 50 runs through the engagement section 84, in which the stripping claws 154 in the opened position are moved downward in direction E until they are at the level of the longitudinal cut under the ankle knuckle 208 as shown in FIG. 8G. Subsequently the stripping claws 154 are closed in order to abut the bone with the finished edges 160.

Figure 8H:
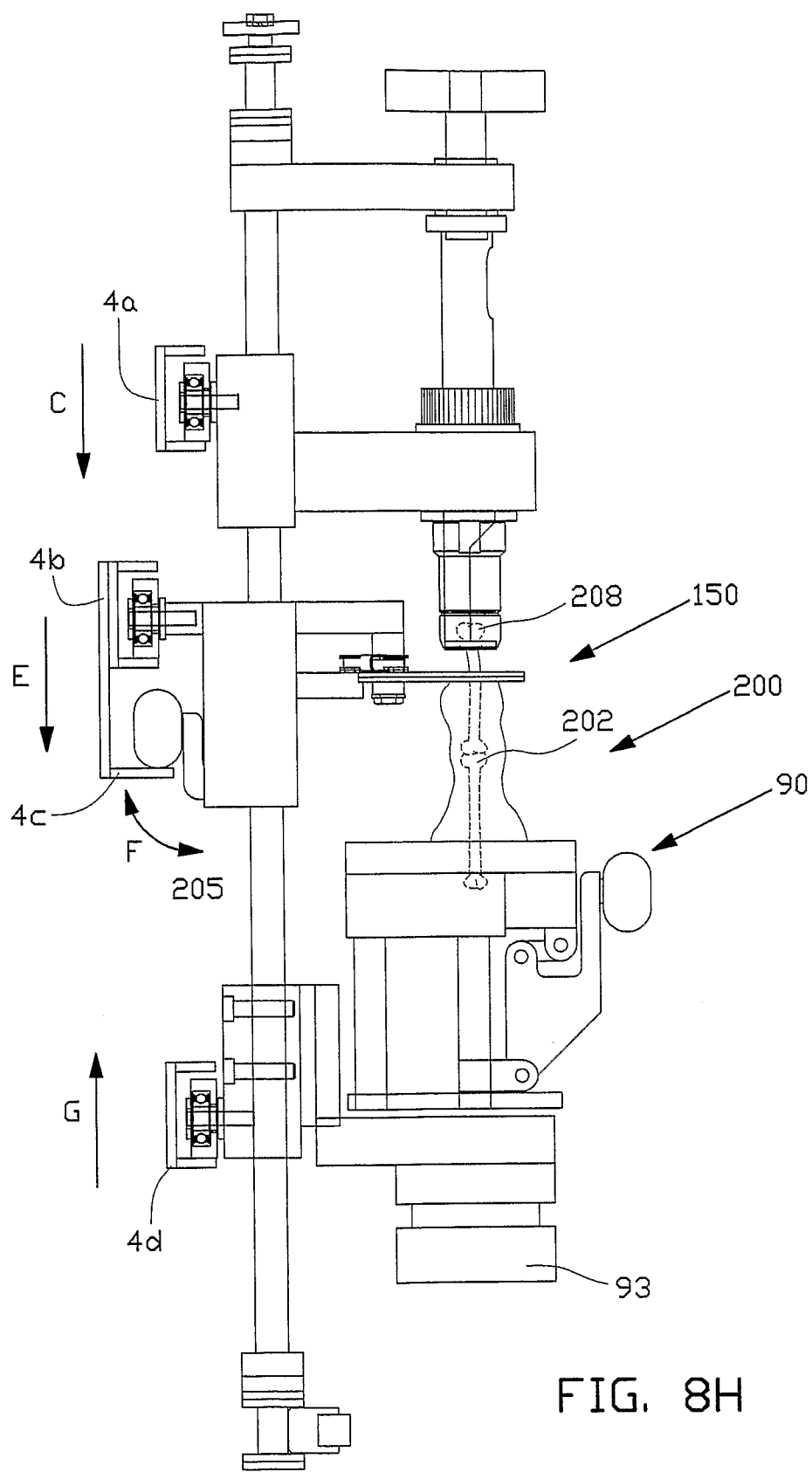
Figure 8J:
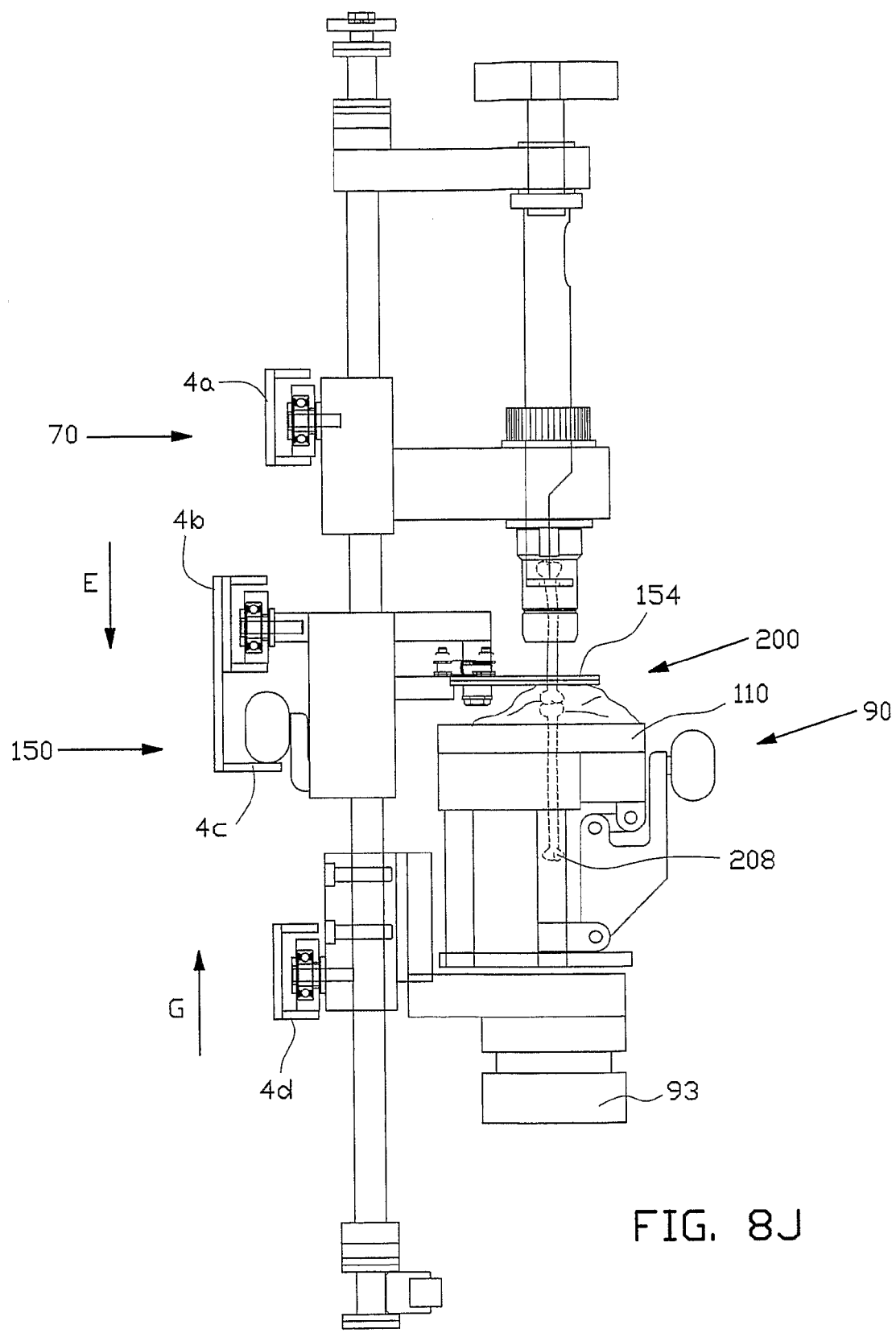
Figure 8K:
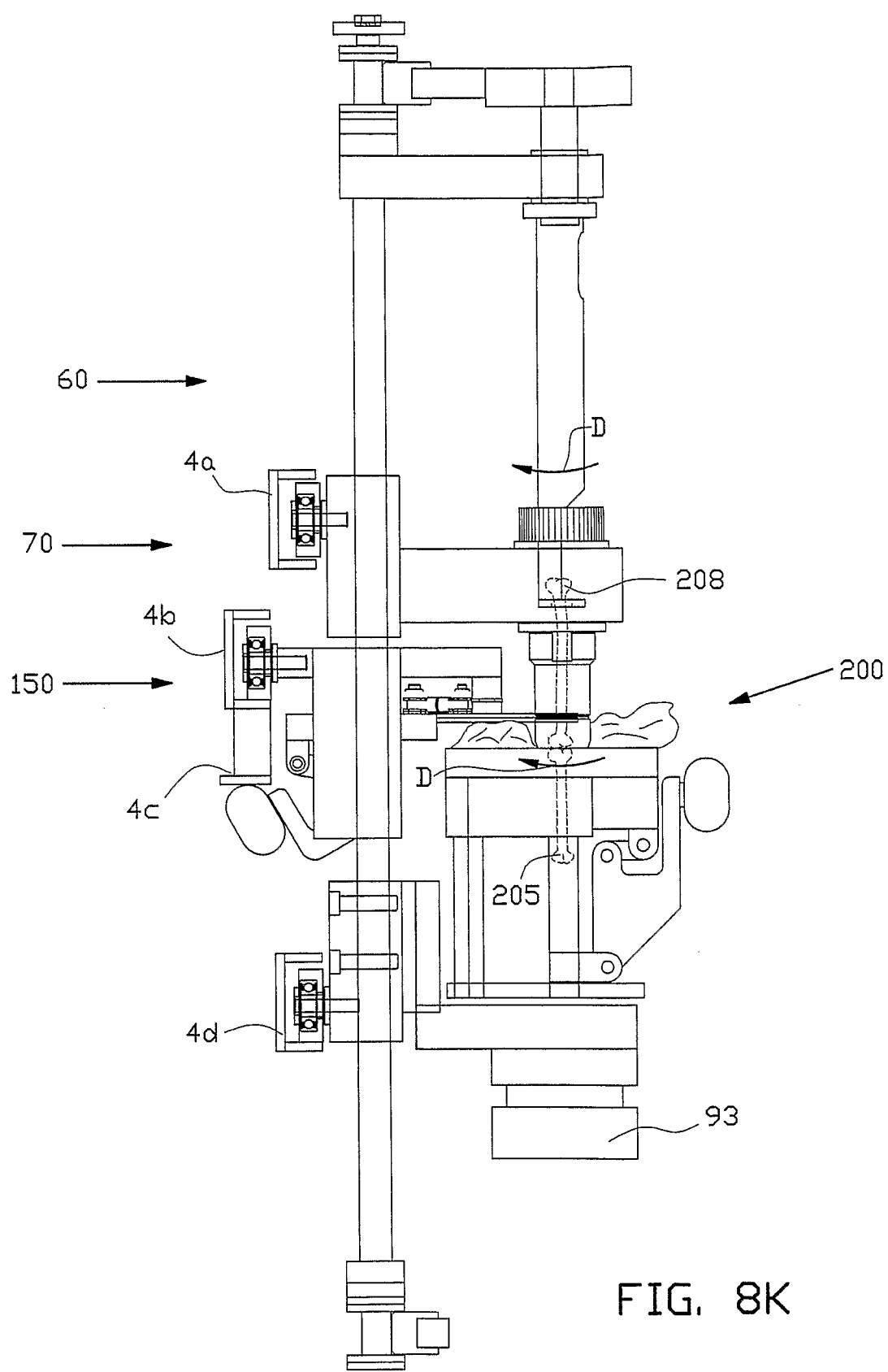

In the subsequent stripping section 85 the stripping claws 154 move further down in direction E and the attachment plate 110 moves upward in direction G as shown in FIG. 8H. The cylinder blade 71 follows the stripping claws 154 in direction C at short distance. Due to the mutual movement of the stripping claws 154 and the attachment plate 110, the meat is stripped from the ankle knuckle 108 and the hip knuckle 205 towards the knee joint 202, wherein the hip knuckle 205 is accommodated more deeply into the hip knuckle holder 90 via opening 108, and the ankle knuckle 208 remains in confinement behind the attachment claws 63. The meat is then pressed against the attachment plate 110 by the stripping claws 154 and driven from the bones as shown in FIG. 8J. At the end of the stripping section 85 the stripping claws 154 open, after which the cylinder blade 71 passes in between until it is pressed forcefully against the attachment plate 110 and the closing piece 109 as shown in FIG. 8K. The knee joint 202 is then situated in the bowl-shaped lowerings 91 in the attachment plate 110 and the closing piece 109. Due to the tension in the meat when compressing, cutting all round with the cylinder blade 71 runs smoothly. The meat rotating along with the rotating cylinder blade 71 is prevented by the detaining forces of the stripping claws 154. Because the stripping claws 154 open when passing the cylinder blade 71, the meat placed under tension is pulled away from the path of the cylinder blade 71.

Subsequently the cylinder blade 71 is rotated in direction D during the round cutting section 86 due to engagement of the toothed wheel 75 onto a stationary gear rack (not further shown) along the conveyor track, as a result of which the last parts of the meat around the knee joint 202 are cut loose.

Figure 8L:
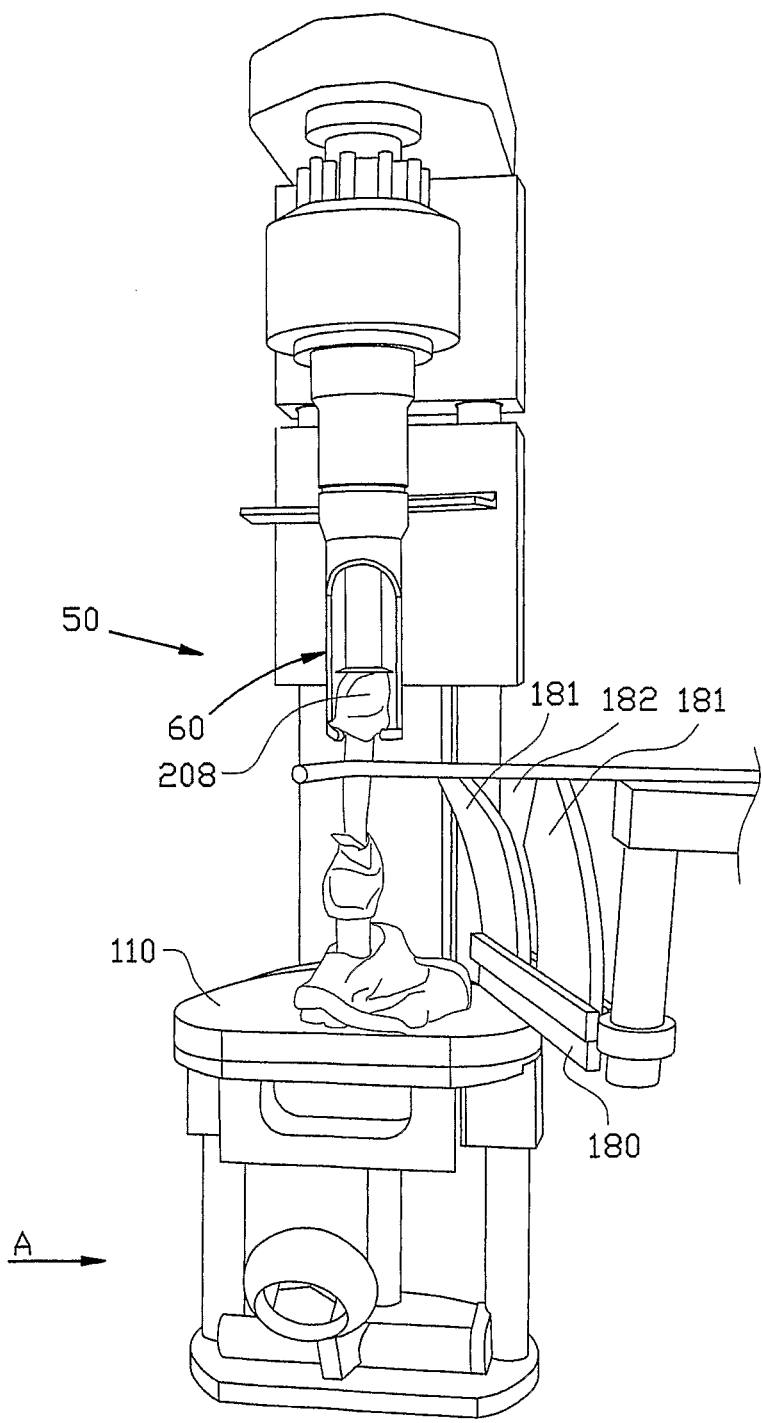

During the subsequent release section 87 the cylinder blade 71 and the stripping claws are brought upward, to the initial position. The hip knuckle holder 90 is opened and brought down, as a result of which the still connected bones are kept above the meat by the ankle knuckle holder 60. This is shown in FIG. 8L. An elastic slider 180 positioned along the conveyor track subsequently wipes the meat from the hip knuckle holder 90, wherein the bones may pass through an opening 182 between the two upright elastic flaps 181 on the slider 180. Behind the slider 180 a stationary longitudinal bar (not shown) is positioned that presses the ankle knuckle in a direction counter the accommodation direction out of the ankle knuckle holder 60.

FIGS. 8M-8Q show the operation of the deboner 1 in an alternative stripping section 85' and round cutting section 86', wherein the knee capsule cutter 300 is used. The alternative stripping section 85' starts after the stripping claws 154 have been closed as shown in FIG. 8G. The vertical movements of the round cutter 70, the stripper 150 and the hip knuckle holder 90 are then controlled by curve paths 4 that have been locally adapted for that purpose.

Figure 8M:
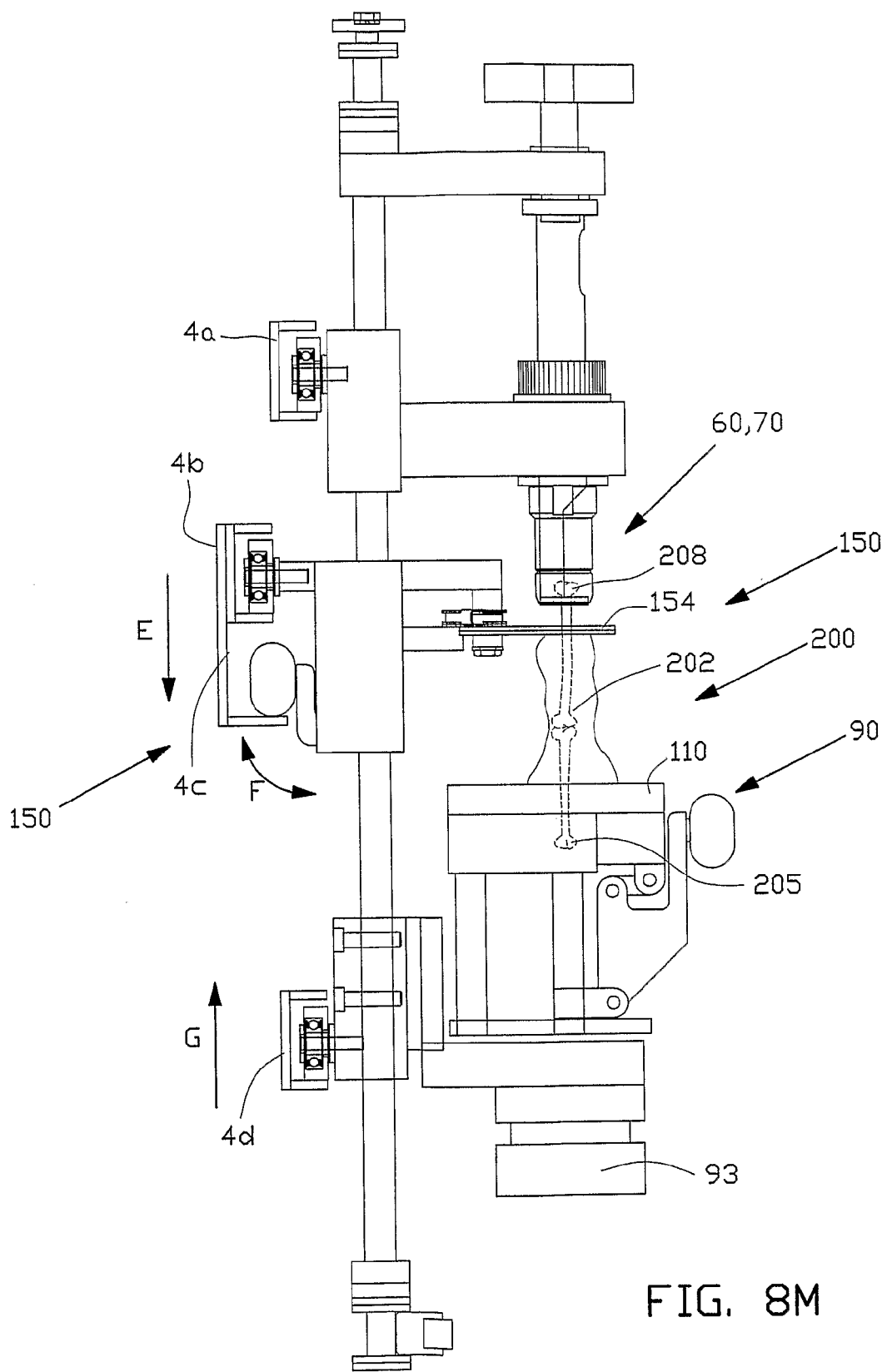
FIG. 8M, 8N, 8P, 8Q show consecutive alternative process steps for deboning a chicken leg by using the knee capsule cutter according to FIGS. 7A and 7B.
Figure 8N:
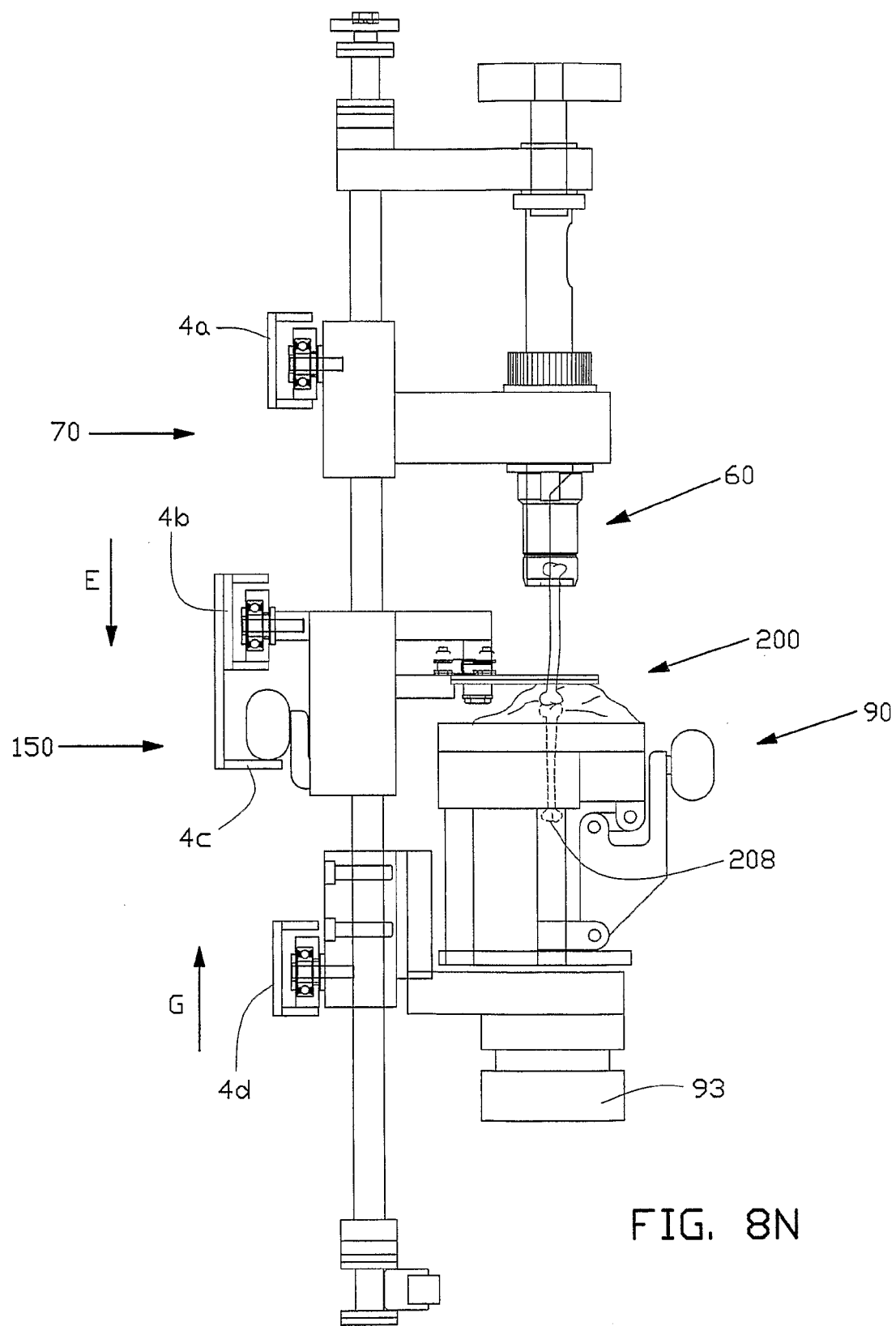

In the alternative stripping section 85' the stripping claws 154 move further down in direction E and the attachment plate 110 moves upward in direction G as shown in FIG. 8M. Due to the mutual movement of the stripping claws 154 and the attachment plate 110, the meat is stripped from the ankle knuckle 108 and the hip knuckle 205 towards the knee joint 202, wherein the hip knuckle 205 is accommodated more deeply into the hip knuckle holder 90 via opening 108, and the ankle knuckle 208 remains in confinement behind the attachment claws 63. The meat is then pressed against the attachment plate 110 by the stripping claws 154 and driven from the bones as shown in FIG. 8N.

Figure 8P:
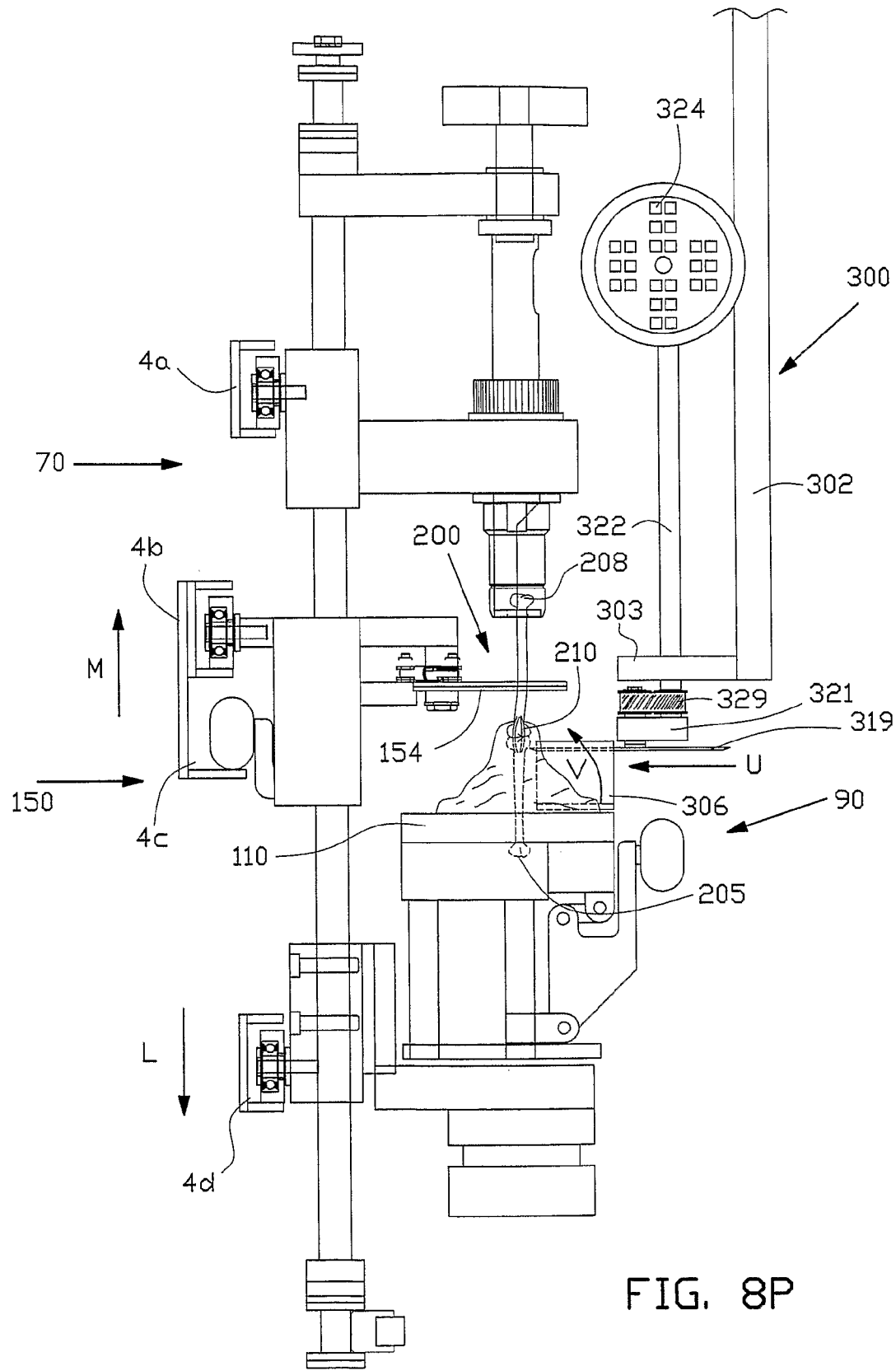

As shown in FIG. 8P the stripping claws 154 open at the end of the alternative stripping section 85' and they move back upward in the opened position in direction M, wherein the stripping claws 154 in height direction at approximately halfway the attachment plate 110 and the attachment claws 63 stand still as shown in FIG. 8P. The stripping claws 154 are then free from the meat. Simultaneously with moving the stripping claws 154 upward in direction M, the hip knuckle holder 90 moves down again in direction L, as a result of which the knee joint 200 is held amply above the attachment plate 110 again by the ankle knuckle holder 60.

Figure 8Q:
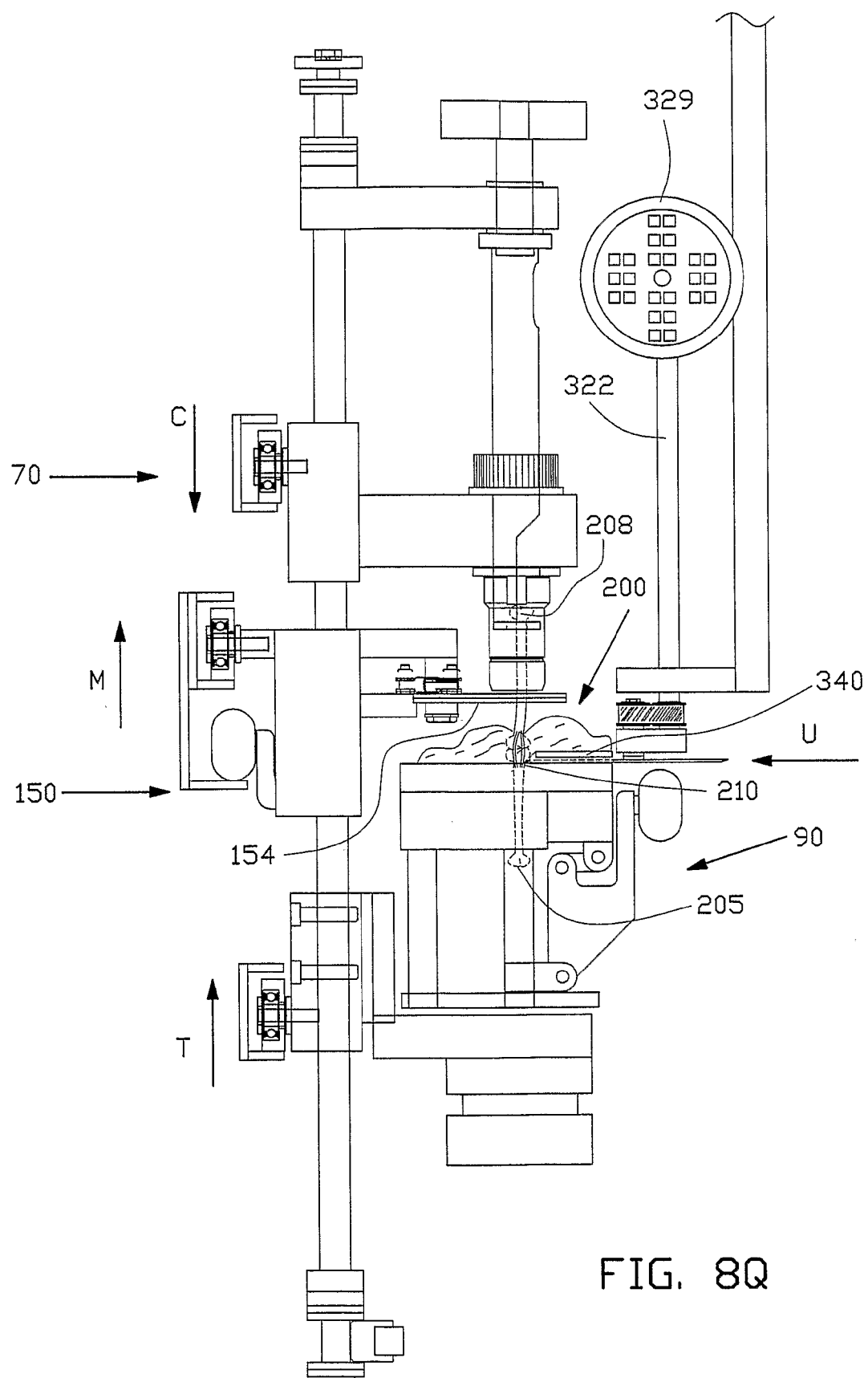

The position of the hip knuckle holder 90 situated lower, as shown in FIG. 8P, suffices for in the subsequent alternative round cutting section 86' bringing the attachment plate 110 under the free scraping edge 340 of the slopingly downward pending first lifting track 306 of the knee capsule cutter 300. As shown in FIGS. 8P and 8Q the hip knuckle holder 90 moves upward in direction T when the attachment plate 110 has arrived under the scraping edge 340 in the transport direction A. During the continuous motion of the deboning unit 50 in direction A, the portion of the meat at the side of the knee capsule cutter 140 slides in direction V over the first lifting track 306, as a result of which this meat portion is held above the attachment plate 110 and the knee capsule 210 still connected to the bone becomes freely accessible in horizontal direction over the upper surface of the hip knuckle holder 90. During the upward motion of this meat portion over the first lifting track 306, the stripping claws 154 are closed shortly in order to retain the position of the ankle knuckle 208 in the ankle knuckle holder 60.

The upward motion of the hip knuckle holder 90 in direction T continues until the attachment plate 110 with only slight vertical intermediate distance has arrived under the meeting circular blade 319 as shown in FIG. 8Q. The first lifting track 306 in this case has come to lie substantially horizontal in line with the second lifting track 305, and the knee joint 202 hangs above the upper surface of the attachment plate 110. Due to the motion of the deboning unit 50 in direction A the circular blade 319 shaves over the attachment plate 110 and cuts through the knee capsule 210 under the knee joint 202. The circular blade 319, during the contact with the bone, reciprocally moves while exerting a slight pressure force in direction U on the capsule 210 and the bone under the knee capsule 210.

As soon as the meat starts sliding over the second lifting track 305, the cylinder blade 71 moves down in order for with the cutting edge 74 finally go past the stripping claws 154 that were shortly before that opened again. Just after the circular blade 319 has become detached from the knee capsule 210 and the bone at that location, the cylinder blade 71 and the stripping claws 154 together move down in direction C and E, respectively, as a result of which the stripping claws 154 exert a detaining force on the meat and the cylinder blade 71 comes into contact with the attachment plate 110. As described above and shown in FIG. 8K, the cylinder blade is rotated in direction D in order to cut the last parts of the meat around the knee joint 202 loose all round, after which the release section 87 as described above is run through.

Figure 9A:
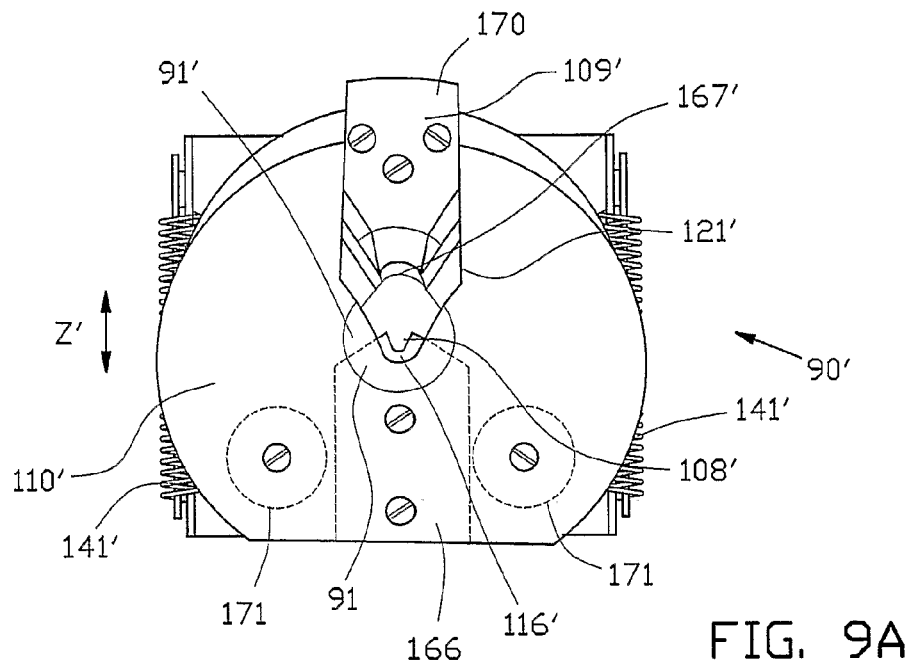
FIGS. 9A and 9B show a top view in perspective and a side view of an alternative hip knuckle holder for the deboning unit.
Figure 9B:
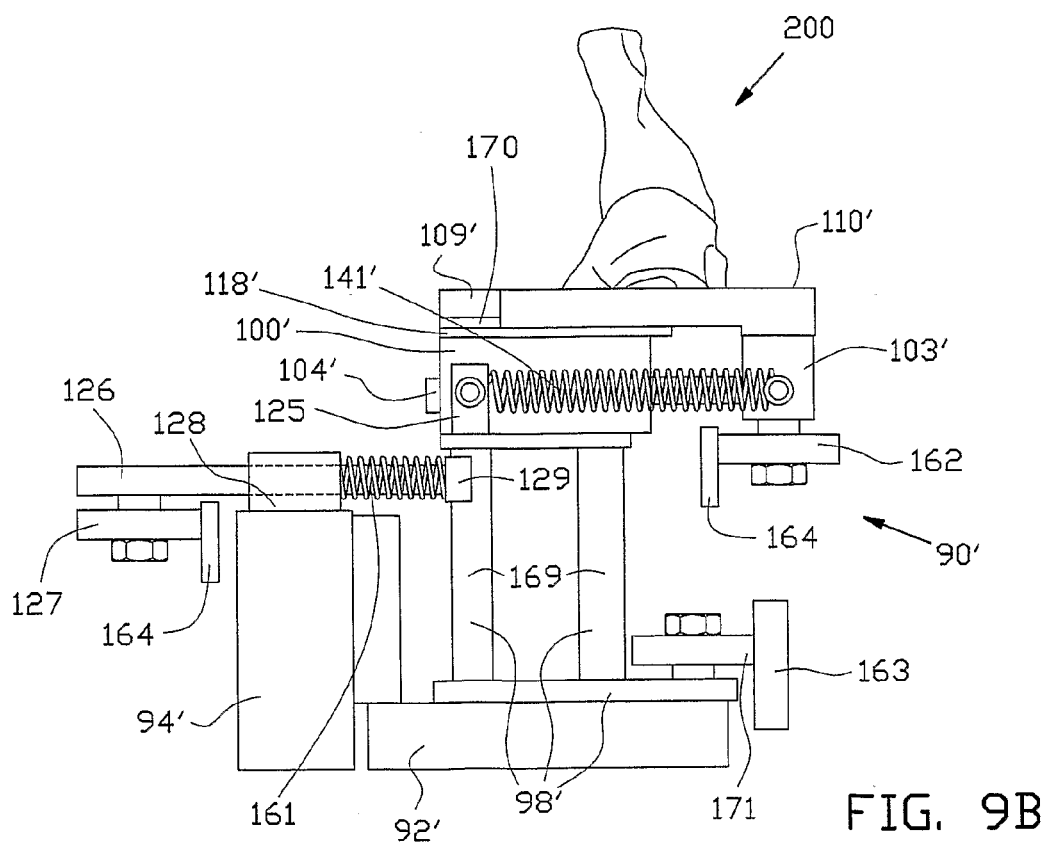

FIGS. 9A and 9B show an alternative hip knuckle holder 90' for the deboning unit 50. Corresponding parts have been provided with reference numbers with an accent.

The metal base 98' of the alternative hip knuckle holder 90' is provided with two rollers 171 at the bottom side facing away from the carriage 94, which rollers in transport direction are positioned adjacent to each other. During transport the rollers may roll against a support strip 163 extending in the transport direction A, which strip is stationarily attached to the frame 2, as a result of which it can be counteracted that the horizontal support 92 sags and bulges to the outside during the cylinder blade 71 exerting the cutting force on the attachment plate 110.

The hip knuckle holder 90' comprises a guide 128 on the carriage 94' through which guide a pressure bar 126 extends. At an end the pressure bar 126 comprises a C-bracket 129 which is held against one of the merlons 169 of the base 98 by a compression spring 161 in order to block rotation of the base 98. Across the C-bracket 129, the pressure bar 126 comprises a roller 127 which can roll against a support strip 164 at the frame 2 in order to move the pressure bar 126 and thus the C-bracket away from the merlon in order to allow temporary rotation of the base 98', for instance during the transverse cutting section 83.

The hip knuckle holder 90' comprises a synthetic attachment plate 110' that supports on the metal support plate 118' on the support block 100'. In a slit-shaped recess at the bottom side of the attachment plate 110' an elongated replaceable blade 166 has been screwed tight. The blade 166 has a tapering end in which the cutting or scraping edge 116' has been formed. On the metal support plate 118' an elongated replaceable blade 170 has also been screwed tight having a synthetic closing piece 109' thereon. The cutting or scraping edge 167' of this blade 170 projects from the closing piece 91'.

The hip knuckle holder 90' on both sides comprises a draw spring 141' that have been attached to the slide block 103' and to a bracket 125 of the base 98'. The draw springs 141' extend parallel to the guides 104' and are situated in a horizontal plane through the guides 104'. The draw springs 141' pre-bias the slide block 103' in the direction Z' in the direction of the support block 100'. At the bottom side of the slide block 103' a roller 162 is attached which can roll against a support strip 164 that has been stationarily attached to the frame 2, as a result of which the hip knuckle holder 90' can be temporarily opened, for instance to place a chicken leg 200.

The invention claimed is:

1. A device for removing meat from filleting or deboning leg parts of poultry, the leg parts including a leg bone terminating in an ankle knuckle, a hip bone terminating in a hip knuckle, and a joint connecting the leg bone to the hip bone, comprising an ankle knuckle holder for positioning the ankle knuckle,
a hip knuckle holder defining a hip knuckle opening configured for receiving the hip knuckle,
means for moving said ankle knuckle holder and said hip knuckle holder toward each other so that the hip bone passes through the hip knuckle opening,
first stripping means movable along the leg bone from adjacent said ankle knuckle holder toward said hip knuckle holder for stripping meat from the leg bone toward the joint,
second stripping means aligned with said hip knuckle opening and configured for stripping meat from the hip bone toward the joint as the hip knuckle passes through said hip knuckle opening of said hip knuckle holder,
a cutter movable from said ankle knuckle holder about the leg bone toward the joint for cutting the meat from the leg bone and the hip bone at the joint, and
a tube surrounding said ankle knuckle holder, said tube defining a laterally facing recess for exposing said ankle knuckle holder, a cylindrical cutter extending about said tube, and means for moving said cylindrical cutter telescopically about said tube for closing said laterally facing recess and confining the ankle knuckle in said ankle knuckle holder.

2. The device according to claim 1 wherein said ankle knuckle holder is configured for permanently holding the end of the leg bone while removing meat from the leg bone.

3. The device according to claim 1, and wherein said cylindrical cutter includes a cylindrical cutting edge for cutting meat from the leg bone and from the hip bone at the leg joint.

4. The device according to claim 1, wherein said ankle knuckle holder includes a U-shaped knuckle holder for engaging the leg bone, and said cylindrical cutter comprises a cylinder blade telescopically movable about said U-shaped knuckle holder for closing the ankle knuckle in said U-shape.

5. The device according to claim 1, wherein said ankle knuckle holder comprises first gripper means for at least partially engaging about a narrowed portion of the leg behind a knuckle of the leg, said ankle knuckle holder including a hollow tube defining a laterally facing placement opening in lateral alignment with said first gripper means for placing the ankle knuckle in said ankle knuckle holder and then bringing the narrowed portion of the leg in contact with the said first gripper.

6. The device according to claim 5, wherein the first gripper comprises at least one U-shaped claw for fitting about the narrowed portion behind the knuckle of the leg.

7. The device according to claim 5, wherein the first gripper comprises two opposite first gripper members in U-shaped arrangement of a size to fit within said hollow tube and to fit the narrowed portion of the leg behind the ankle knuckle.

8. The device according to claim 5, wherein the ankle knuckle holder comprises a hollow tube, wherein the placement opening is formed by a recess in the sidewall of the hollow tube intersecting the open end of the hollow tube.

9. A device for deboning a leg of poultry, the leg including a leg bone terminating in an ankle knuckle, a hip bone terminating in a hip knuckle, and a joint connecting the leg bone to the hip bone, comprising:
   a conveyor means,
   a plurality of deboning modules carried along a processing path by said conveyor means,
   said deboning modules each including an ankle knuckle holder for grasping the ankle knuckle, and a hip knuckle holder including a passage there through for receiving the hip,
   said ankle knuckle holder including a tube defining a lateral recess and attachment claws extending partially across the recess for receiving the ankle knuckle through the recess,
   said conveyor means including means for moving said ankle knuckle holder and said hip knuckle holder toward each other so that the hip bone moves through the passage of said hip knuckle holder,
   hip bone stripping means aligned with said passage of said hip knuckle holder and configured for stripping meat from the hip bone toward the joint as the hip bone passes through said hip knuckle passage of said hip knuckle holder,
   leg bone stripping means configured for surrounding said leg bone and for engaging the leg bone at the ankle knuckle,
   said conveyor means including means for moving said leg bone stripping means along said leg bone from the ankle knuckle toward the joint of the poultry leg and stripping the meat of the leg bone toward the joint, so that the meat from both the leg bone and the hip bone are accumulated at the knee joint,
   a cylinder blade positioned about said ankle knuckle holder and telescopically movable along said tube for closing said laterally extending opening,
   said conveyor means including means for moving said cylinder blade from said ankle knuckle holder and about the leg bone to the joint and into the accumulated meat at the joint for cutting the meat accumulated from the leg bone and the meat accumulated from the hip bone at the joint.

10. The device of claim 9, wherein
   said conveyor means includes means for releasing said hip knuckle holder from the hip knuckle while said ankle knuckle holder continues to grasp the ankle knuckle, and
   meat removal means positioned adjacent the processing path for moving said accumulated meat away from said hip bone holder as said ankle knuckle holder continues to carry the ankle knuckle.

11. The device of claim 10, wherein said meat removal means comprises elastic flaps positioned adjacent the path of said hip knuckle holder.

12. The device of claim 9, wherein said ankle knuckle holder includes a hollow vertically positioned tube rotatable about its vertical axis, a recess defined by the side wall of said tube that includes an inclined lower portion, and horizontally extending attachment claws in said lower portion of said tube shaped to engage a poultry leg at the ankle knuckle.

13. The device of claim 9, and further including attachment claws configured for engaging the poultry leg at the ankle knuckle, and wherein said hollow vertically positioned tube is sized to surround said attachment claws and is vertically movable about said attachment claws.

14. The device of claim 9, wherein said hip knuckle holder comprises an attachment plate that includes a central opening sized and shaped for receiving the hip knuckle of a poultry leg and for passing the hip bone through said central opening.

\* \* \* \* \*